US010541920B2

(12) United States Patent
Akiyoshi

(10) Patent No.: US 10,541,920 B2
(45) Date of Patent: *Jan. 21, 2020

(54) COMMUNICATION SYSTEM, COMMUNICATION DEVICE, CONTROLLER, AND METHOD AND PROGRAM FOR CONTROLLING FORWARDING PATH OF PACKET FLOW

(71) Applicant: NEC Corporation, Tokyo (JP)

(72) Inventor: Ippei Akiyoshi, Tokyo (JP)

(73) Assignee: NEC CORPORATION, Tokyo (JP)

(*) Notice: Subject to any disclaimer, the term of this patent is extended or adjusted under 35 U.S.C. 154(b) by 227 days.

This patent is subject to a terminal disclaimer.

(21) Appl. No.: 15/164,571

(22) Filed: May 25, 2016

(65) Prior Publication Data

US 2016/0269289 A1   Sep. 15, 2016

Related U.S. Application Data

(63) Continuation of application No. 14/935,704, filed on Nov. 9, 2015, now Pat. No. 9,497,118, which is a
(Continued)

(30) Foreign Application Priority Data

Nov. 22, 2010   (JP) ................................. 2010-260272

(51) Int. Cl.
*H04L 12/741* (2013.01)
*H04L 12/721* (2013.01)
(Continued)

(52) U.S. Cl.
CPC ........... *H04L 45/745* (2013.01); *H04L 45/22* (2013.01); *H04L 45/30* (2013.01); *H04L 45/38* (2013.01);
(Continued)

(58) Field of Classification Search
None
See application file for complete search history.

(56) References Cited

U.S. PATENT DOCUMENTS 5,305,305 A    4/1994  Harper et al.
6,775,706 B1 * 8/2004  Fukumoto ............... H04L 45/00
                                                          370/389
(Continued)

FOREIGN PATENT DOCUMENTS

CN    101416455 A    4/2009
EP    1 328 095 A2   7/2003
(Continued)

OTHER PUBLICATIONS

Extended European Search Report dated Oct. 2, 2017.
(Continued)

*Primary Examiner* — Chi H Pham
*Assistant Examiner* — Vladislav Y Agureyev
(74) *Attorney, Agent, or Firm* — McGinn I.P. Law Group, PLLC.

(57) ABSTRACT

A communication system includes a network device to be used for packet handling; and a controller capable of sending, to network device, a packet handling rule according to a first protocol.

The network device classifies, based on a condition, indicative of a scope under which the controller is capable of controlling the network device, whether to handle the packet according to the packet handling rule sent from the controller or to handle the packet according to a table entry that the network device autonomously sets based on a second protocol.

17 Claims, 21 Drawing Sheets

Related U.S. Application Data continuation of application No. 14/459,139, filed on Aug. 13, 2014, now Pat. No. 9,203,754, which is a continuation of application No. 13/696,792, filed on Nov. 7, 2012, now Pat. No. 8,842,673.

(51) Int. Cl.
| | |
|---|---|
| *H04W 40/00* | (2009.01) |
| *H04L 12/725* | (2013.01) |
| *H04L 29/08* | (2006.01) |
| *H04L 29/06* | (2006.01) |
| *H04L 12/707* | (2013.01) |
| *H04L 12/717* | (2013.01) |

(52) U.S. Cl.
CPC ............ *H04L 45/42* (2013.01); *H04L 45/54* (2013.01); *H04L 67/1002* (2013.01); *H04L 69/22* (2013.01); *H04W 40/00* (2013.01)

(56) References Cited

U.S. PATENT DOCUMENTS

| | | |
|---|---|---|
| 6,804,234 B1 | 10/2004 | Chow |
| 7,254,645 B2 | 8/2007 | Nishi |
| 7,489,681 B1 | 2/2009 | Aggarwal |
| 7,522,627 B2* | 4/2009 | Lam ........................ H04L 45/04 370/427 |
| 7,826,461 B2 | 11/2010 | Okagawa et al. |
| 8,214,533 B2 | 7/2012 | Nishi |
| 8,503,307 B2* | 8/2013 | Tourrilhes ........... H04L 41/0816 370/230 |
| 8,737,394 B2 | 5/2014 | Dong et al. |
| 2001/0027484 A1 | 10/2001 | Nishi |
| 2002/0118682 A1 | 8/2002 | Choe |
| 2003/0031192 A1 | 2/2003 | Furuno |
| 2003/0067925 A1 | 4/2003 | Choe et al. |
| 2003/0142679 A1 | 7/2003 | Okagawa et al. |
| 2003/0182429 A1 | 9/2003 | Jagels |
| 2004/0004968 A1 | 1/2004 | Nassar |
| 2004/0013120 A1 | 1/2004 | Shen |
| 2004/0196827 A1 | 10/2004 | Xu et al. |
| 2004/0202158 A1 | 10/2004 | Takeno et al. |
| 2004/0218611 A1 | 11/2004 | Kim |
| 2005/0122955 A1 | 6/2005 | Lin et al. |
| 2005/0265346 A1 | 12/2005 | Ho et al. |
| 2008/0013549 A1* | 1/2008 | Okagawa ................ H04L 45/00 370/397 |
| 2008/0040469 A1 | 2/2008 | Nishi |
| 2009/0059800 A1 | 3/2009 | Mohan |
| 2010/0080233 A1 | 4/2010 | Kwapniewski |
| 2010/0208744 A1 | 8/2010 | Shaikh |
| 2010/0265943 A1 | 10/2010 | Dong et al. |
| 2011/0211583 A1* | 9/2011 | Seetharaman .......... H04L 45/00 370/400 |
| 2011/0261816 A1 | 10/2011 | Morris |
| 2011/0261825 A1 | 10/2011 | Ichino |
| 2011/0271007 A1* | 11/2011 | Wang ................... H04L 45/306 709/238 |
| 2011/0286324 A1* | 11/2011 | Bellagamba ........ H04L 41/0677 370/219 |
| 2011/0317559 A1* | 12/2011 | Kern ........................ H04L 45/02 370/235 |
| 2012/0044813 A1* | 2/2012 | Nandagopal ............ H04L 45/28 370/242 |
| 2012/0127997 A1 | 5/2012 | Zinjuwadia |
| 2012/0269053 A1* | 10/2012 | Yu ........................ H04L 12/4641 370/216 |
| 2012/0314605 A1 | 12/2012 | Akiyoshi |
| 2013/0058351 A1* | 3/2013 | Casado ................... H04L 47/00 370/400 |
| 2013/0148667 A1 | 6/2013 | Hama et al. |
| 2013/0223226 A1* | 8/2013 | Narayanan ............ H04L 45/308 370/236 |

FOREIGN PATENT DOCUMENTS

| | | |
|---|---|---|
| JP | H04-233845 A | 8/1992 |
| JP | 2001-282760 A | 10/2001 |
| JP | 2002-185513 A | 6/2002 |
| JP | 2003-209567 A | 7/2003 |
| JP | 2004-129135 A | 4/2004 |
| JP | 2005-340983 A | 12/2005 |
| JP | 2007-151172 A | 6/2007 |
| JP | 2010-034961 A | 2/2010 |
| JP | 2010-161473 A | 7/2010 |
| JP | 2010-193357 A | 9/2010 |
| WO | WO 2008/095010 A1 | 8/2008 |
| WO | WO 2009/092252 A1 | 7/2009 |
| WO | WO 2010/090182 A1 | 8/2010 |
| WO | WO 2010/103909 A1 | 9/2010 |

OTHER PUBLICATIONS

OpenFlow Switch Specification Version 1.0.0. (Wire Protocol 0x01) [searched on Oct. 6, 2010], Internet <URL: http://www.openflowswitch.org/documents/openflow-spec-v1.0.0.pdf>.

Hironobu Hida et al., Implementation and Performance Evaluation of Traffic Engineering Scheme Based on Multiple Routing Tables, Technical Report of Ieice, NS2003-308, IN2003-263, The Institute of Electronics, Information and Communication Engineers, Feb. 27, 2004, pp. 65-70.

McKeown, Nick et al., "OpenFlow: Enabling Innovation in Campus Networks," [online], [searched on Oct. 6, 2010], Internet < URL: http://www.openflowswitch.org/documents/openflow-wp-latest.pdf>.

International Search Report (ISR) PCT/JP2011/005010 dated Dec. 13, 2011, in PCT/JP2011/005010.

United States Office Action dated Mar. 4, 2014 in U.S. Appl. No. 13/865,799.

United States Office Action dated Jul. 29, 2013 in U.S. Appl. No. 13/865,799.

Japanese Office Action dated May 28, 2013 with a partial English translation.

Japanese Office Action dated Aug. 20, 2013 with a partial English translation.

Hideyuki Shimonishi et al., Building Hierarchical Switch Network Using OpenFlow', Intelligent Networking and Collaboration Systems, 2009. INCOS '09. International Conference on Nov. 4, 2009. pp. 391-394.

Japanese Office Action dated Jul. 22, 2014 with an English translation.

Japanese Office Action dated Nov. 26, 2013, with partial English translation.

Kanaumi, et al. "Realization of Autonomous Distribution of Open Flow Architecture", Internet Conference 2009.

Japanese Office Action dated May 8, 2015 with a partial English translation thereof.

Chinese Office Action dated Apr. 16, 2015 with an English Translation thereof.

United States Office Action dated Apr. 17, 2015, in co-pending U.S. Appl. No. 14/459,093.

Japanese Office Action dated Sep. 13, 2016, with a partial English translation.

\* cited by examiner

FIG. 2

TABLE 2000-2

TABLE CONSTITUTED BY ENTRY B SET BY COMMUNICATION DEVICES

TABLE 2000-1

TABLE CONSTITUTED BY ENTRY A SET BY CONTROLLER

FIG. 12

| IMPORT INFORMATION | OUTPUT PORT INFORMATION | FLOW SCOPE |
|---|---|---|
| 1 | 1 | Any |

FIG. 13

| | |
|---|---|
| IMPORT INFORMATION | 1,4 |
| OUTPUT PORT INFORMATION | 1,4 |
| FLOW SCOPE | Any |

FIG. 19

| WILDCARDS | IN PORT | ETHER SA | ETHER DA | ETHER TYPE | VLAN ID | VLAN PCP | IP SA | IP DA | IP PROTO | IP ToS BITS | TCP/UDP SRC PORT | TCP/UDP DST PORT | COUNTERS | ACTIONS |
|---|---|---|---|---|---|---|---|---|---|---|---|---|---|---|

HEADER FIELDS; MATCHING RULE (spans from WILDCARDS through TCP/UDP DST PORT)

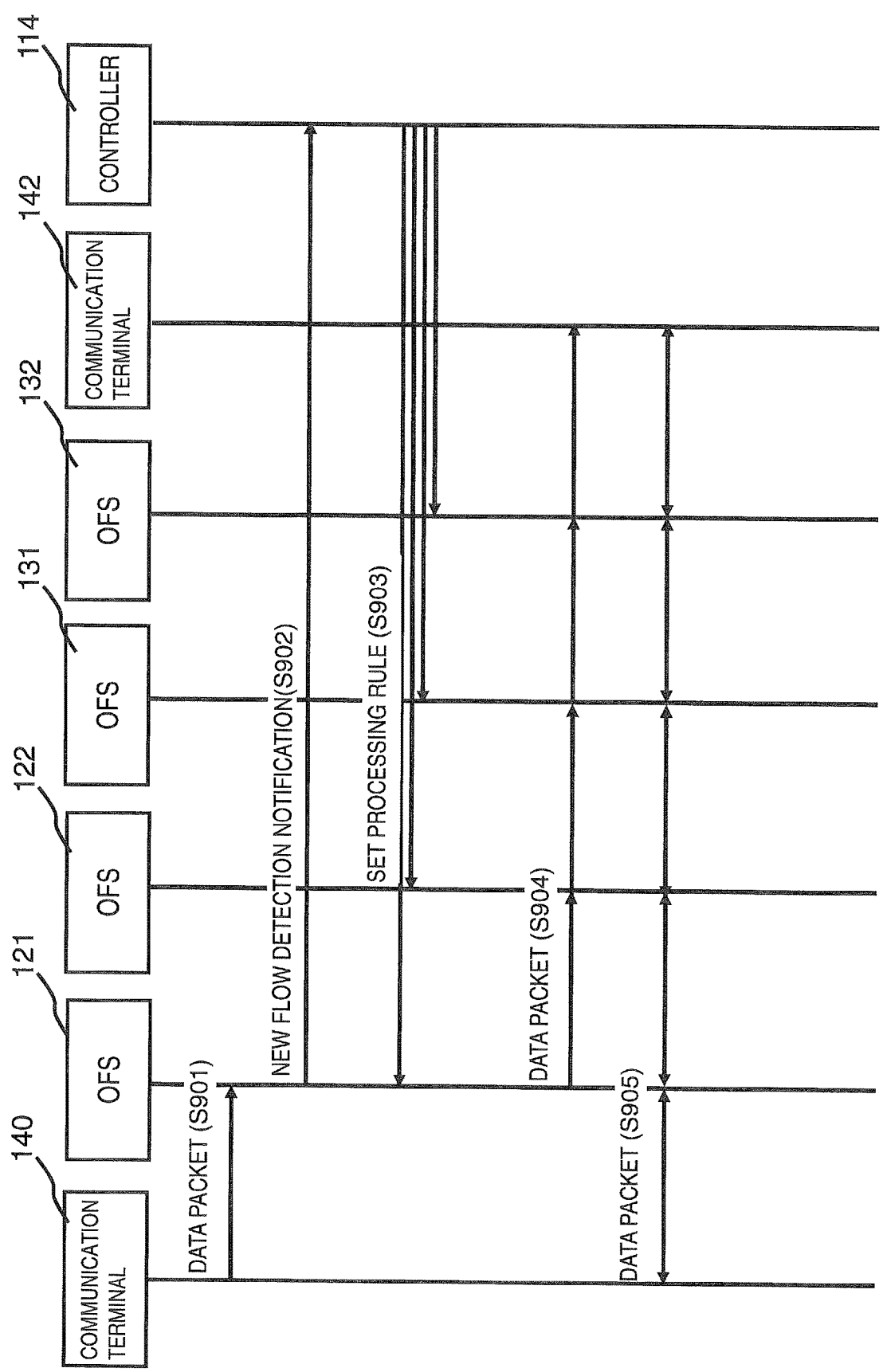

COMMUNICATION SYSTEM, COMMUNICATION DEVICE, CONTROLLER, AND METHOD AND PROGRAM FOR CONTROLLING FORWARDING PATH OF PACKET FLOW

CROSS-REFERENCE TO RELATED APPLICATIONS

This Application is a Continuation Application of U.S. patent application Ser. No. 14/935,704, filed on Nov. 9, 2015; which is Continuation Application of U.S. patent application Ser. No. 14/459,139, filed on Aug. 13, 2014, now U.S. Pat. No. 9,203,754; which is Continuation Application of U.S. patent application Ser. No. 13/696,792, filed on Nov. 7, 2012 now U.S. Pat. No. 8,842,673.

The present invention is based upon and claims the benefit of the priority of Japanese patent application No. 2010-260272 filed on Nov. 22, 2010, the disclosure of which is incorporated herein in its entirety by reference thereto.

TECHNICAL FIELD

The present invention relates to a communication system, communication device, controller, and method and program for controlling forwarding path of a packet flow, and particularly to a communication system, communication device, controller, and method and program for controlling forwarding path of a packet flow realizing communication using a communication device that processes a received packet according to processing rules compatible with the received packet.

BACKGROUND ART

In recent years, a technology called OpenFlow has been proposed (refer to Patent Literature 1 and Non Patent Literatures 1 and 2). OpenFlow treats communication as an end-to-end flow, and performs path control, failure recovery, load balancing, and optimization for each flow. An OpenFlow switch, the specification of which is defined in Non Patent Literature 2, comprises a secure channel for communicating with an OpenFlow controller functioning as a control device, and operates according to a flow table suitably added or rewritten by the OpenFlow controller. In the flow table, a set of matching rules (header field) matched against a packet header, flow statistic information (Counters), and an action (Actions) defining the contents of processing is defined for each flow (refer to FIG. 19).

A communication system 1 using the OpenFlow technology can be constituted by, for instance, a controller 114 corresponding to the OpenFlow controller and OpenFlow switches (referred to as "OFS" hereinafter) 121 to 123, and 131 to 133 as shown in FIG. 20.

For instance, when a communication terminal 140 starts to communicate with a communication terminal 142, the system operates as shown in FIG. 21. Upon receiving a packet sent by the communication terminal 140, the OFS 121 searches an entry having matching rules compatible with the header information of the received packet in a flow table. If no entry matching the received packet is found as a result of the search, the OFS 121 sends a new flow detection notification (Packet-In) message equipped with information about the received packet to the controller 114 via a secure channel after buffering the received packet, and requests the controller 114 to determine the path of the packet based on the sender and the receiver of the received packet. The controller 114 specifies the communication terminal 142 as the destination of the packet from the information of the new flow detection notification, sends a flow entry (processing rule) setting (FlowMod) message to set a flow entry realizing communication between the communication terminal 140 and the communication terminal 142 in the OFSs on the path. The OFS 121 forwards the buffered packet using the entry stored in the flow table as a processing rule. A subsequent packet flow is forwarded without requesting the controller 114 to determine the path since the corresponding entry already exists.

Further, Patent Literature 2 discloses a method for configuring a hierarchical network recognizing connection states between devices constituting the network as a hierarchical structure and based on topology information including hierarchy information. Patent Literature 2 states that a server managing each layer or an information relay device having functions of a server determines identification information usable by downstream relay devices connected to the server or the information replay device through an interface on the downstream side of the server or the information relay device, and informs the determined identification information to the downstream relay devices so as to realize effective address distribution in the hierarchical network configuration.

PATENT LITERATURE

[PTL 1]
International Publication No. WO 2008/095010A1
[PTL 2]
Japanese Patent Kokai Publication No. JP2005-340983A
[NPL 1]
McKeown, Nick et al., "OpenFlow: Enabling Innovation in Campus Networks," [online], [searched on Oct. 6, 2010], Internet <URL: http://www.openflowswitch.org/documents/openflow-wp-latest.pdf>
[NPL 2]
"OpenFlow Switch Specification" Version 1.0.0. (Wire Protocol 0x01) [searched on Oct. 6, 2010], Internet <URL: http://www.openflowswitch.org/documents/openflow-spec-v1.0.0.pdf>

SUMMARY

The following analysis is given by the present invention.

As described using FIGS. 20 and 21, in a centralized control system such as OpenFlow, new flow detection notification (Packet-In) messages from many OFSs may concentrate, increasing the load of a centralized controller such as the OpenFlow controller. Further, when the load of the controller increases and the setting of processing rule is delayed, an OFS that has received a subsequent packet is forced to issue a new flow detection notification (Packet-In) message, and this may create a situation where the increased load is maintained.

The present invention has been achieved under consideration the above circumstances, and it is an object thereof to provide a communication system, communication device, controller, and method and program for controlling forwarding path of a packet flow capable of mitigating concentration of path resolution requests issued by individual communication devices in a centralized control communication system such as the OpenFlow technology described above.

According to a first aspect of the present invention, there is provided a communication system including at least one communication device controlling packet forwarding, and a controller setting a first table entry used for packet forwarding according to a request from the communication device, and the communication device determines whether to forward a received packet according to the first table entry or forward the received packet according to a second table entry set by the communication device based on a rule for identifying a received packet.

According to a second aspect of the present invention, there is provided a communication device including means for requesting a controller controlling the communication device to set a first table entry used for packet forwarding, and means for determining whether to forward a received packet according to the first table entry or forward the received packet according to a second table entry set by the communication device based on a rule for identifying a received packet.

According to a third aspect of the present invention, there is provided a communication method including having a communication device controlling packet forwarding determine whether to forward a received packet according to a first table entry set by a controller controlling the communication device or forward the received packet according to a second table entry set by the communication device based on a rule for identifying a received packet, and having the communication device request the controller to set the first table entry when the communication device determines to forward the received packet according to the first table entry. The present method is tied to a particular machine, i.e., a communication device controlling packet forwarding.

According to a fourth aspect of the present invention, there is provided a program having a computer mounted on a communication device controlling packet forwarding execute a process of determining whether to forward a received packet according to a first table entry set by a controller controlling the communication device or forward the received packet according to a second table entry set by the communication device based on a rule for identifying a received packet, and a process of requesting the controller to set the first table entry when it is determined that the received packet is forwarded according to the first table entry. Further, this program can be stored in a computer-readable storage medium which may be non-transient. In other words, the present invention can be embodied as a computer program product.

According to the present invention, it becomes possible to have a communication device bear some part of the control load of a controller and reduce the load thereof.

BRIEF DESCRIPTION OF DRAWINGS

FIG. 2 is a drawing showing a configuration example of a table of the first exemplary embodiment of the present invention.

FIG. 12 is a drawing showing an example of a scope of authority delegated by the controller of the second exemplary embodiment of the present invention to the intermediate controller.

FIG. 13 is a drawing showing another example of a scope of authority delegated by the controller of the second exemplary embodiment of the present invention to the intermediate controller.

FIG. 19 is a drawing showing a configuration example of a flow entry described in Non Patent Literature 2.

FIG. 21 is a sequence diagram for explaining an operation example of the communication systems in of Non Patent Literatures 1 and 2.

FIRST EXEMPLARY EMBODIMENT

Figure 1:
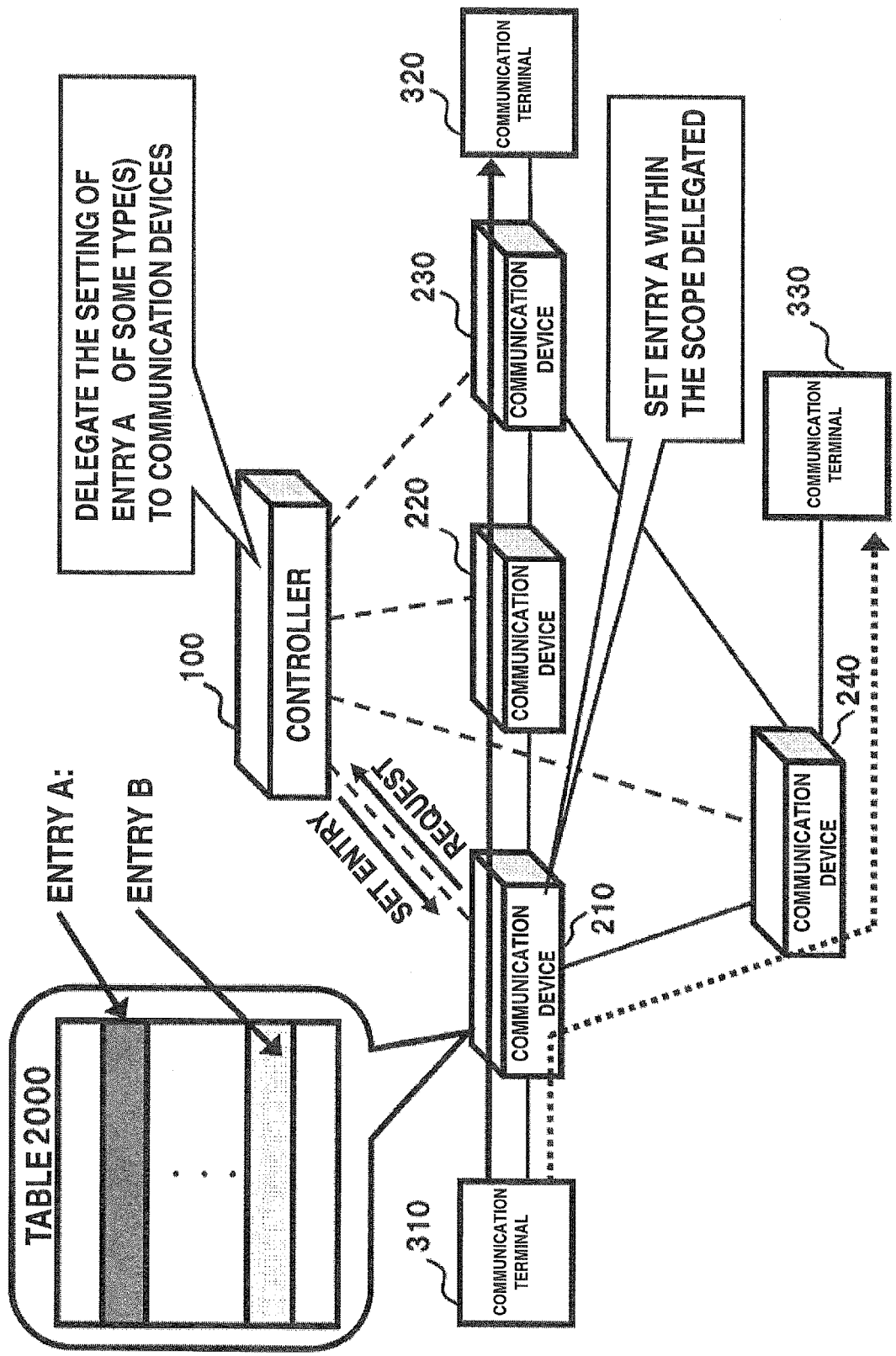
FIG. 1 is a drawing illustrating a configuration example of a communication system of a first exemplary embodiment of the present invention.

A first exemplary embodiment of the present invention will be described. FIG. 1 shows a communication system including a controller 100 that controls the forwarding path of a packet and a plurality of communication devices 210 to 240. In this communication system, each communication device identifies a received packet based on a rule for identifying a packet, and determines whether it forwards the received packet according to a rule set by the controller or it forwards the received packet according to another rule not set by the controller. It should be noted that diagram reference symbols used in this summary are added to elements for the sake of convenience and understanding and they do not limit the present invention to the illustrated embodiments.

In FIG. 1, the communication device 210 holds a table 2000 used for forwarding a received packet. The table 2000 holds at least two types of entries: Entry A set by the controller and Entry B set by a communication device.

The controller 100 generates Entry A according to a request from the communication device 210 and sets the generated Entry A in the table 2000 held by the communication device 210. For instance, when receiving a new packet for which the table 2000 cannot identify a forwarding method, the communication device 210 requests the controller to set an entry corresponding to a method for forwarding this new packet.

Further, the communication device 210 autonomously sets Entry B in the table 2000. For instance, the communication device 210 sets Entry B in the table 2000 by exchanging information with the adjacent communication devices 220 and 240 based on routing protocols such as RIP (Routing Information Protocol) and OSPF (Open Shortest Path First). Further, for instance, the communication device 210 generates and sets Entry B in the table 2000 by learning the association between the source MAC address of a received packet and a port that has received the packet. The other communication devices 220 to 240 set Entry B using similar methods. However, the methods used by the communication devices 210 to 240 to set Entry B are not limited thereto.

FIG. 1 shows an example in which both Entries A and B are set in the table 2000. Setting both entries in one single table 2000 facilitates implementation. In a case where packet processing referring to the table 2000 is executed by hardware, by implementing a system in such a manner that Entries A and B are set in a single table 2000, processing referring to the table 2000 can be executed efficiently.

As shown in FIG. 2, however, each communication device may hold an Entry A table 2000-1 set by the controller and an Entry B table 2000-2 set by the communication devices 210 to 240. It should be noted that the configuration of the table is not limited to those shown in FIGS. 1 and 2.

The communication device 210 determines whether to forward a received packet according to Entry A in the table 2000 or forward it according to Entry B in the table 2000 based on the identification rule for identifying a received packet.

The identification rule can be set by suitably combining the source/destination of a packet and the type of a packet according to the use of a system to which the present invention is applied, how roles are assigned to the controller and the communication devices, and whether or not wide area central control is required.

For instance, the identification rule may be configured so as to recognize whether a received packet should be forwarded within a predetermined network domain or across a plurality of network domains. In other words, for instance, a communication device (edge node) located on a boundary between a first network and a second network forwards a received packet according to the controller 100, and a communication device (core node) transmitting data within the first network forwards a received packet autonomously. Further, the identification rule may be configured so as to recognize whether or not a received packet is of a predetermined type. Further, the identification rule may be configured so as to recognize whether or not a received packet relates to predetermined source information or destination information. It should be noted, however, that the identification rule is not limited thereto.

Figure 3:
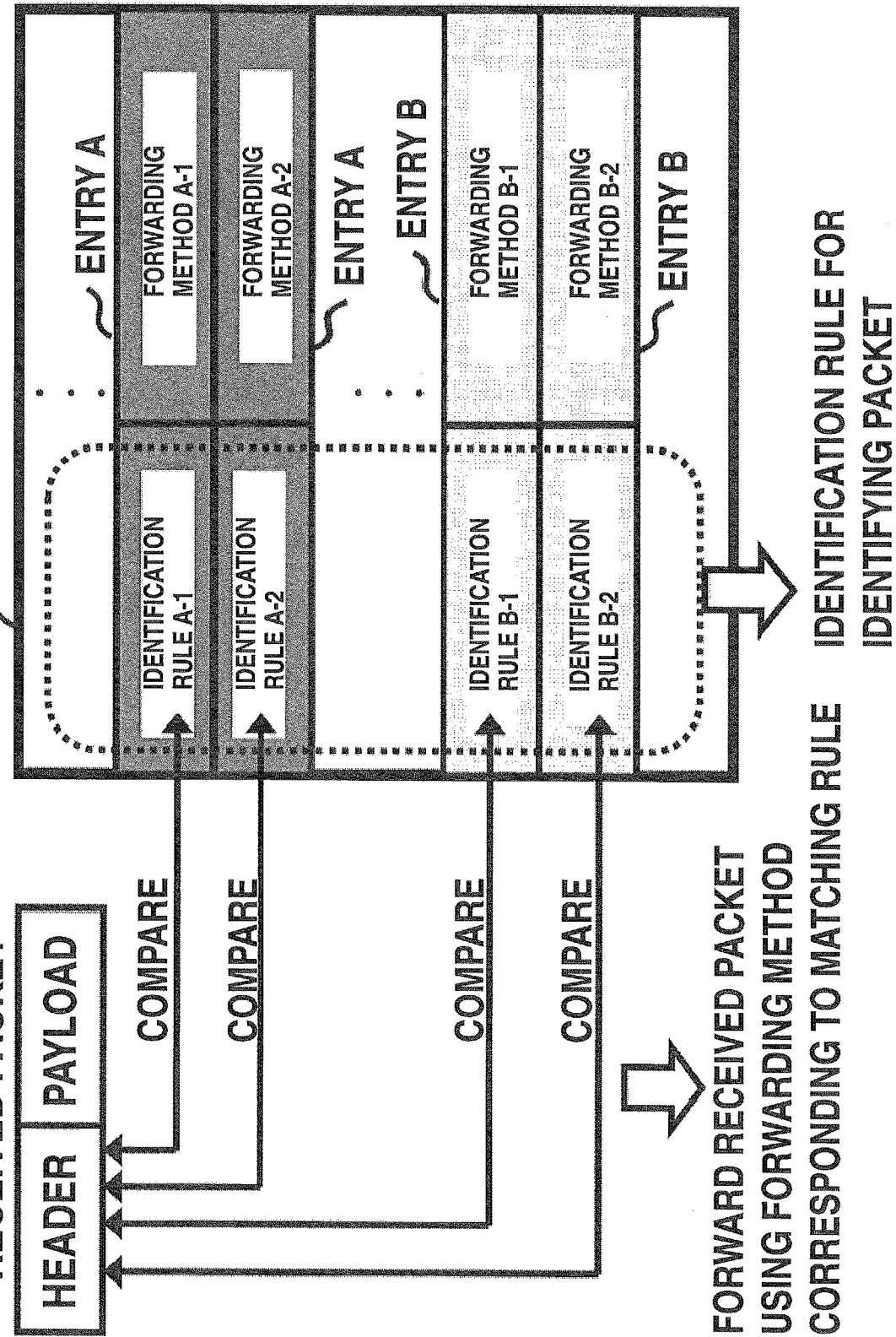
FIG. 3 is a drawing for explaining an operation example of the first exemplary embodiment of the present invention.
Figure 4:
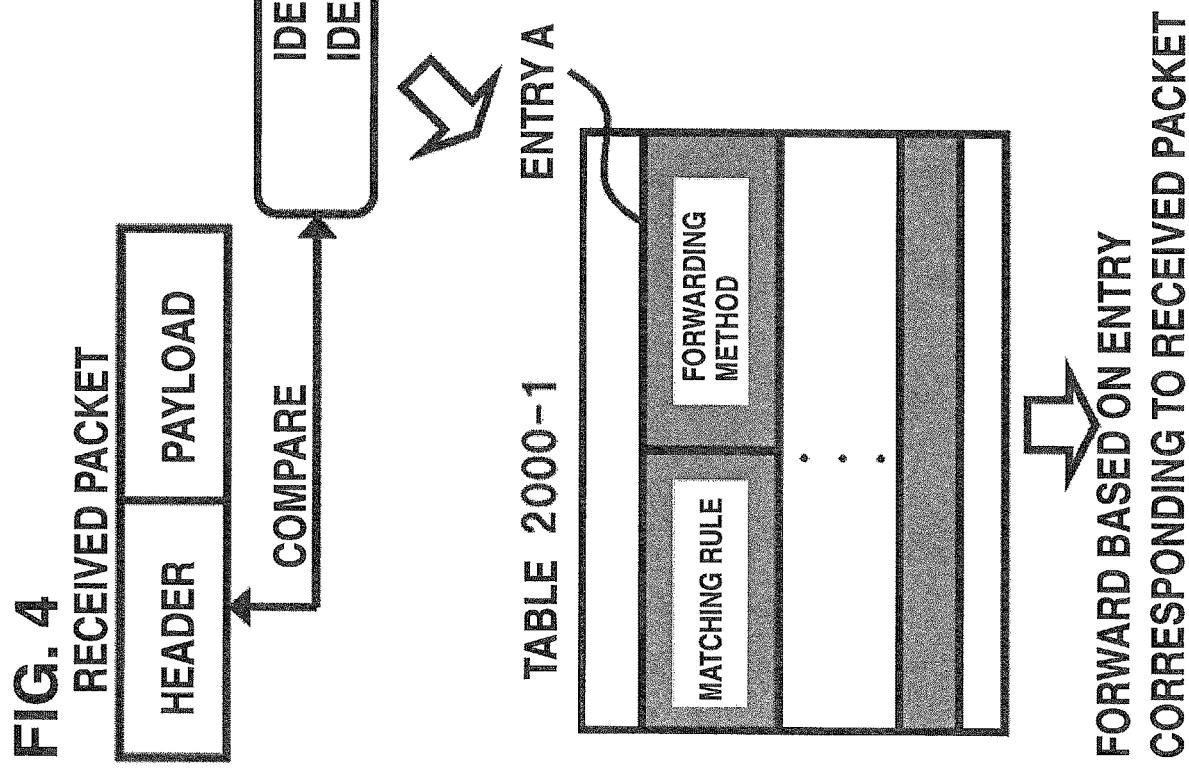
FIG. 4 is a drawing for explaining an operation example of the first exemplary embodiment of the present invention.

With reference to FIGS. 3 and 4, an operation example of the communication system shown in FIG. 1 will be described. It should be noted that the operation of the present invention is not limited to what is shown in FIGS. 3 and 4.

FIG. 3 shows an operation example of the case where the table 2000 includes Entries A and B, as shown in FIG. 1. In FIG. 3, the identification rule is included in each Entry. The table 2000 has a plurality of types of Entries A and a plurality of types of Entries B. The communication device 210 compares the header of a received packet to the identification rule of each entry in the table 2000. When the header matches any identification rule, the communication device 210 forwards the received packet according to a forwarding method defined in an entry corresponding to that identification rule. The header of the received packet and the identification rules are compared in this example, however, any information in the received packet may be compared to the identification rules, without being limited thereto.

For instance, when the received packet matches an identification rule A-2 in FIG. 3, the communication device 210 forwards the received packet according to a forwarding method A-2. Further, when the received packet matches an identification rule B-1 in FIG. 3, the communication device 210 forwards the received packet according to a forwarding method B-1.

For instance, when there is no entry having a matching identification rule in the table 2000, the communication device 210 requests the controller 100 to set an entry.

In the operation example above, the communication device 210 determines whether to forward the received packet according to Entry A set by the controller or forward the received packet according to Entry B set autonomously by the communication device, based on the identification rules.

FIG. 4 shows an operation example of the case where the communication device 210 has the table 2000-1 storing Entry A set by the controller and the table 2000-2 storing Entry B set autonomously by the communication device 210, as shown in FIG. 2.

The communication device 210 compares the header of a received packet to the identification rules, and determines whether to refer to the table 2000-1 storing Entry A or refer to the table 2000-2 storing Entry B. The header of the received packet and the identification rules are compared in this example, however, any information in the received packet may be compared to the identification rules, without being limited thereto.

Entries A and B include matching rules for determining according to which entry in the tables a received packet should be forwarded. Further, Entries A and B also include forwarding methods corresponding to the matching rules. The communication device 210 compares the header of the received packet to the matching rule of each entry and forwards the packet according to the forwarding method of the matched entry. For instance, the matching rules define the network information of the destination of a packet, and when the destination of the received packet matches this network information, the received packet is forwarded from a port (directed to a port of the destination) defined in the forwarding method. The header of the received packet and the matching rules are compared in this example, however, any information in the received packet may be compared to the matching rules, without being limited thereto.

Further, for instance, when the communication device 210 refers to the table 2000-1 and there is no entry having a matching rule matching the received packet in the table 2000-1, the communication device 210 requests the controller 100 to set an entry.

In the operation example above, the communication device 210 determines whether to forward the received packet according to Entry A set by the controller or forward the received packet according to Entry B set autonomously by the communication device, based on the identification rules.

Figure 5:
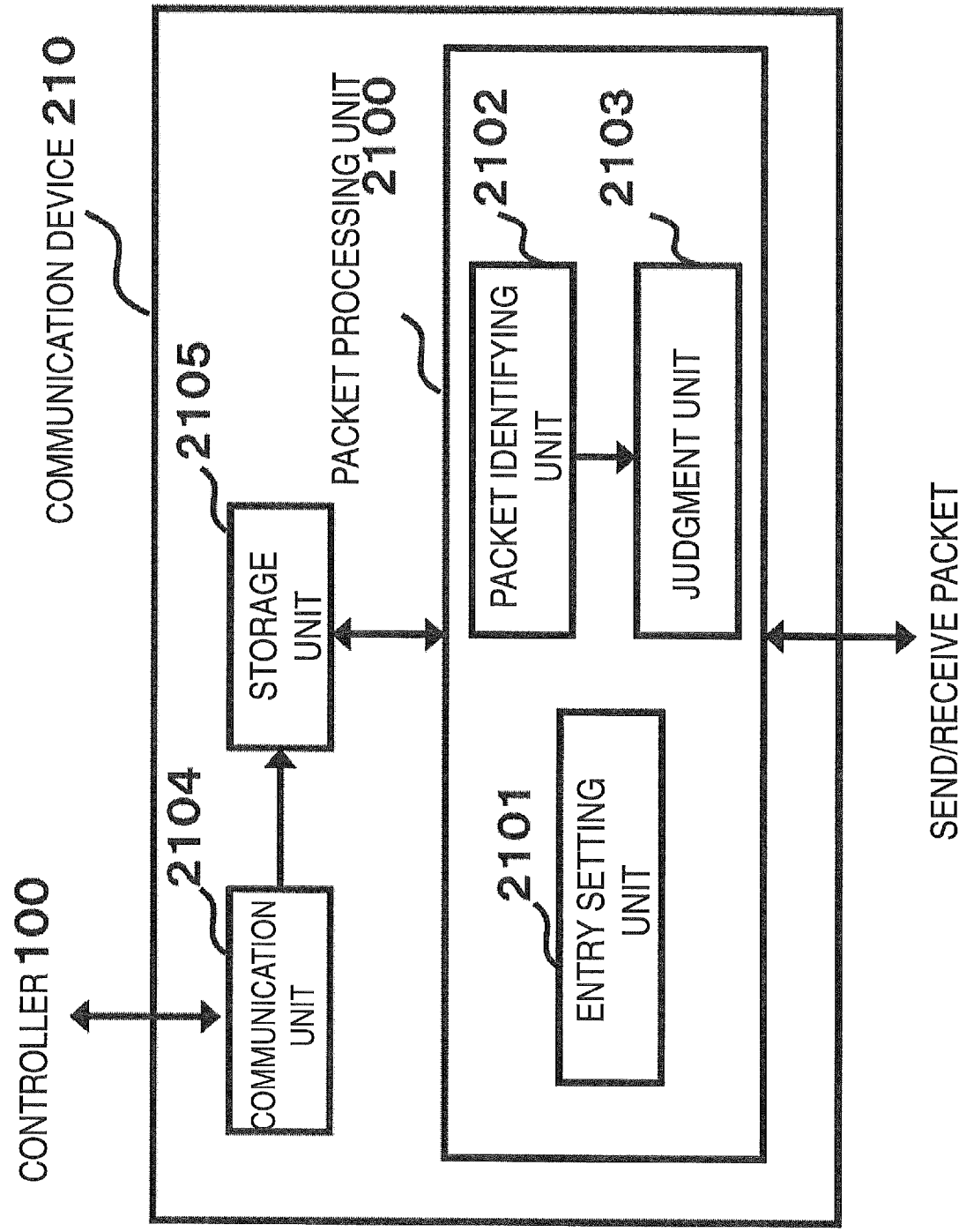
FIG. 5 is a drawing showing a configuration example of a communication device 210 of the first exemplary embodiment of the present invention.
Figure 6:
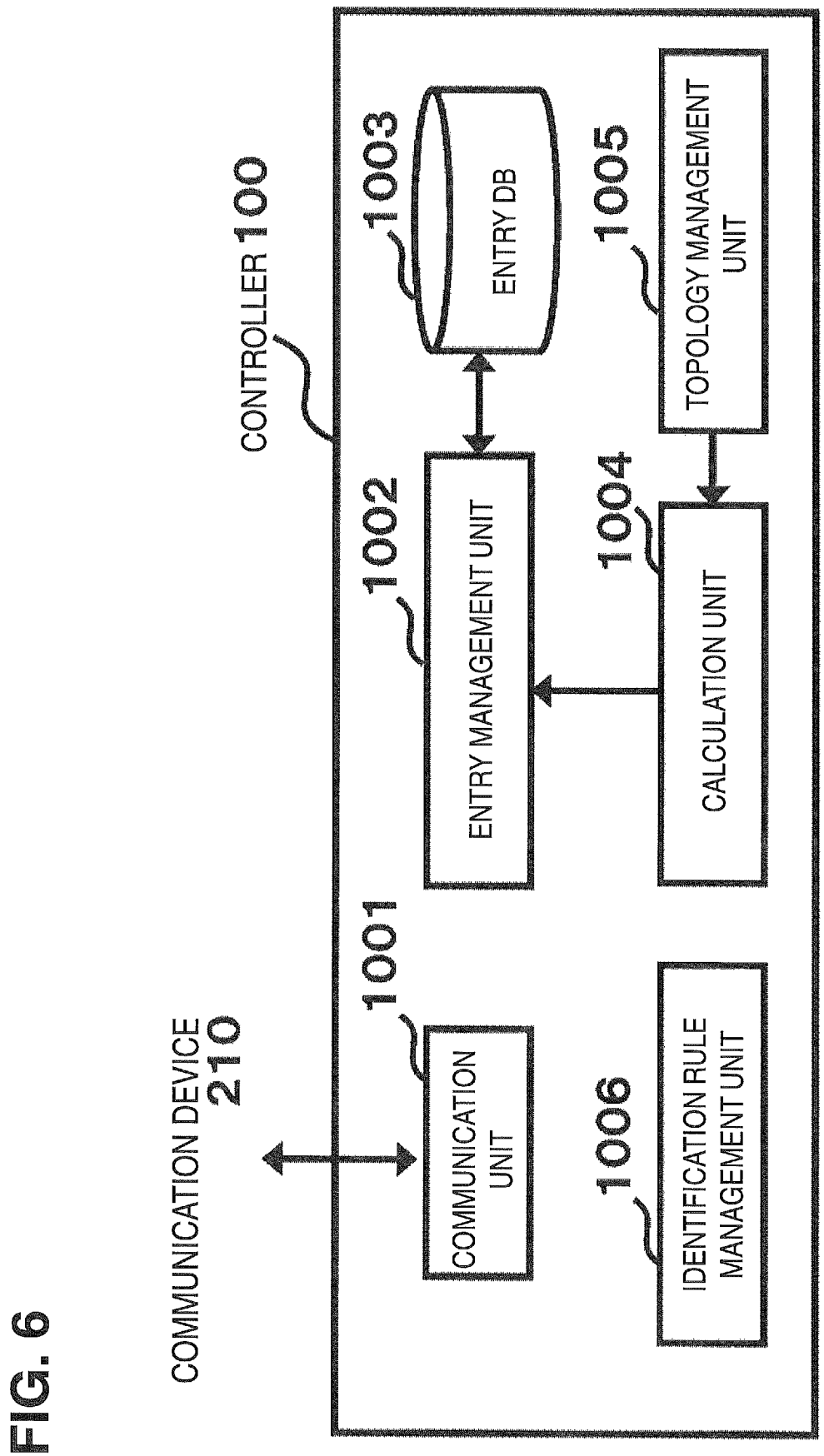
FIG. 6 is a drawing showing a configuration example of a controller 100 of the first exemplary embodiment of the present invention.

With reference to FIGS. 5 and 6, configuration examples of the controller 100 and the communication device 210 will be described. Note that the present invention is not limited to the configuration examples shown in FIGS. 5 and 6.

FIG. 5 shows a configuration example of the communication device 210. Note that the other communication devices 220 to 240 are configured identically. A communication unit 2104 communicates with the controller 100. For instance, the communication unit 2104 requests the controller 100 to set an entry or receives information relating to an entry sent by the controller 100. A storage unit 2105 holds the table 2000 and the identification rule. A packet processing unit 2100 refers to the table 2000 and the identification rule held by the storage unit 2105, and executes packet processing such as forwarding a received packet, discarding a packet, and rewriting a packer header. The packet processing unit 2100 includes an entry setting unit 2101, a packet identifying unit 2102, and a judgment unit 2103. The entry setting unit 2101 exchanges routing information with an adjacent communication device based on a predetermined routing protocol (for instance, RIP and OSPF), and sets an entry in the table held by the storage unit 2105. Further, the entry setting unit 2101 generates an entry by learning the association between the source MAC address of a received packet and a port that has received the packet, and sets the generated entry in the table. The packet identifying unit 2102 identifies a received packet based on the identification rule held by the storage unit 2105. The judgment unit 2103 determines whether to process the received packet according to an entry set by the controller 100 or process the received packet according to an entry set by the entry setting unit 2101, depending on the identification results of the packet identifying unit 2102.

FIG. 6 shows a configuration example of the controller 100. A communication unit 1001 communicates with the communication device 210. For instance, the communication unit 1001 receives a request for setting an entry from the communication device 210, and sends information relating an entry to the communication device 210. An entry DB 1003 stores entry candidates to be set in the communication device 210. A topology management unit 1005 constructs network topology information based on the connection relations of the communication devices collected from the communication devices 210 to 240. A calculation unit 1004 refers to the network topology information constructed by the topology management unit 1005, generates a packet processing method executed by a communication device on the forwarding path of a packet and a matching rule for specifying an execution target packet of the processing method, and generates an entry to be stored in the entry DB. An entry management unit 1002 stores the entry generated by the calculation unit 1004 in the entry DB 1003. Further, the entry management unit 1002 selects an entry to be set for the communication device 210 from entries stored in the entry DB 1003. An identification rule management unit 1006 manages the identification rule for the communication device 210 to identify a received packet. For instance, when the table is configured as in the example in FIG. 3, the identification rule management unit 1006 sets an identification rule in Entry A in the entry DB 1003, and sets an identification rule corresponding to Entry B in the communication device 210. Further, for instance, when the tables are configured as in the example in FIG. 4, the identification rule management unit 1006 notifies the identification rule to the communication device 210.

For instance, the identification rule management unit 1006 generates an identification rule based on a scope of authority delegated to the communication device 210, and set the identification rule for the communication device 210. For instance, the identification rule management unit 1006 delegates authority to the communication device 210 when a received packet is to be forwarded within a predetermined network domain, and does not delegate authority when the received packet is to be forwarded across a plurality of network domains. The communication device 210 processes a received packet according to an entry set by the controller 100 when the received packet belongs to a scope of authority not delegated by the controller 100. The communication device 210 autonomously sets an entry therein when a received packet belongs to the scope of authority delegated by the controller 100. Further, the identification rule management unit 1006 may determine the scope of authority delegated to the communication device 210 taking into consideration the load of the controller 100 and a congestion state between the controller 100 and the communication device 210, and generate the identification rule based on the scope. In such a configuration, the identification rule management unit 1006 is able to expand the scope of authority delegated to the communication device 210, for instance, when the load of the controller 100 is high. By expanding the scope of authority delegated to the communication device 210, the number of entry setting requests to the controller 210 is decreased, reducing the load of the controller 100.

For instance, the communication device 210 sends an entry setting request to the controller 100 when there is no entry corresponding to a received packet in the table 2000. Note that the communication device 210 determines whether or not to send an entry setting request to the controller 100 according to the result of comparing the identification rule set by the identification rule management unit 1006 and the received packet. In other words, the communication device 210 sends an entry setting request to the controller 100 when the received packet is outside the scope of authority delegated by the controller 100. As a result, the load of the controller 100 can be reduced.

Figure 7:
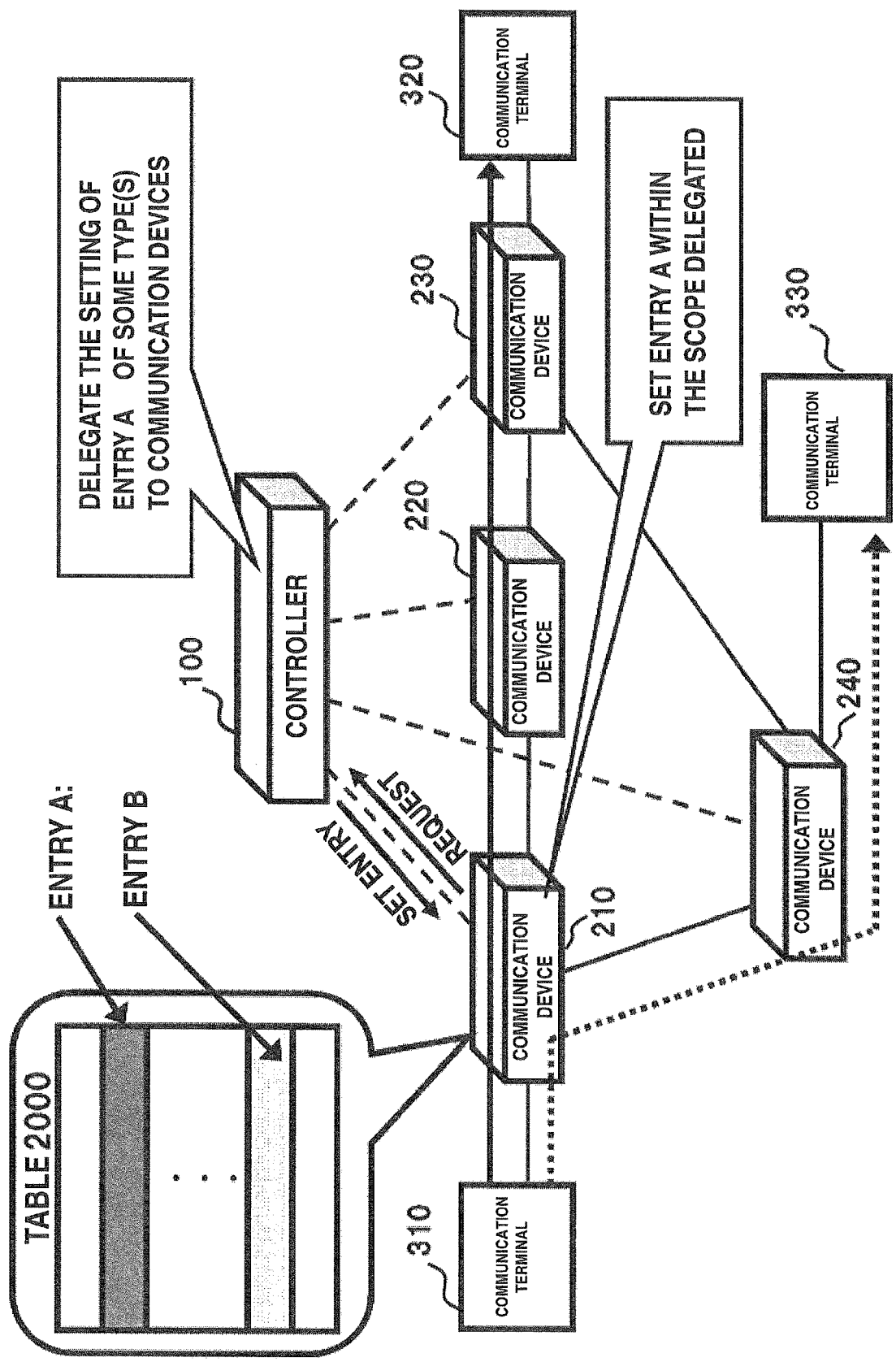
FIG. 7 is a drawing illustrating a configuration example of the communication system of the first exemplary embodiment of the present invention.

In the present invention, the controller 100 may delegate the setting Entry A of some type(s) to the communication devices 210 to 240 as shown in FIG. 7. The load of the controller 100 is reduced, compared to the case where the controller 100 set Entry A of all types. The communication devices 210 to 240 set Entry A in the table 2000 to an extent that the controller 1000 delegates thereto. The communication device 210 determines whether or not a case is within the scope of authority delegated by the controller 100 as far as the setting of Entry A is concerned using, for instance, the identification rule. For instance, the communication device 210 identifies a received packet based on the identification rule, and determines that the case is delegated by the controller 100 as far as the setting of Entry A is concerned when the type of the received packet matches a predetermined condition.

As described, by not requesting the controller 100 to control the forwarding paths of all packets and having the communication devices bear part (some) of the responsibility, it becomes possible to reduce the load of the controller 100. Further, the identification condition can be set by suitably combining the source/destination of a packet and the type of a packet according to the use of a system to which the present invention is applied, how roles are assigned to the controller and the communication devices, and whether or not wide area central control is required.

SECOND EXEMPLARY EMBODIMENT

Figure 8:
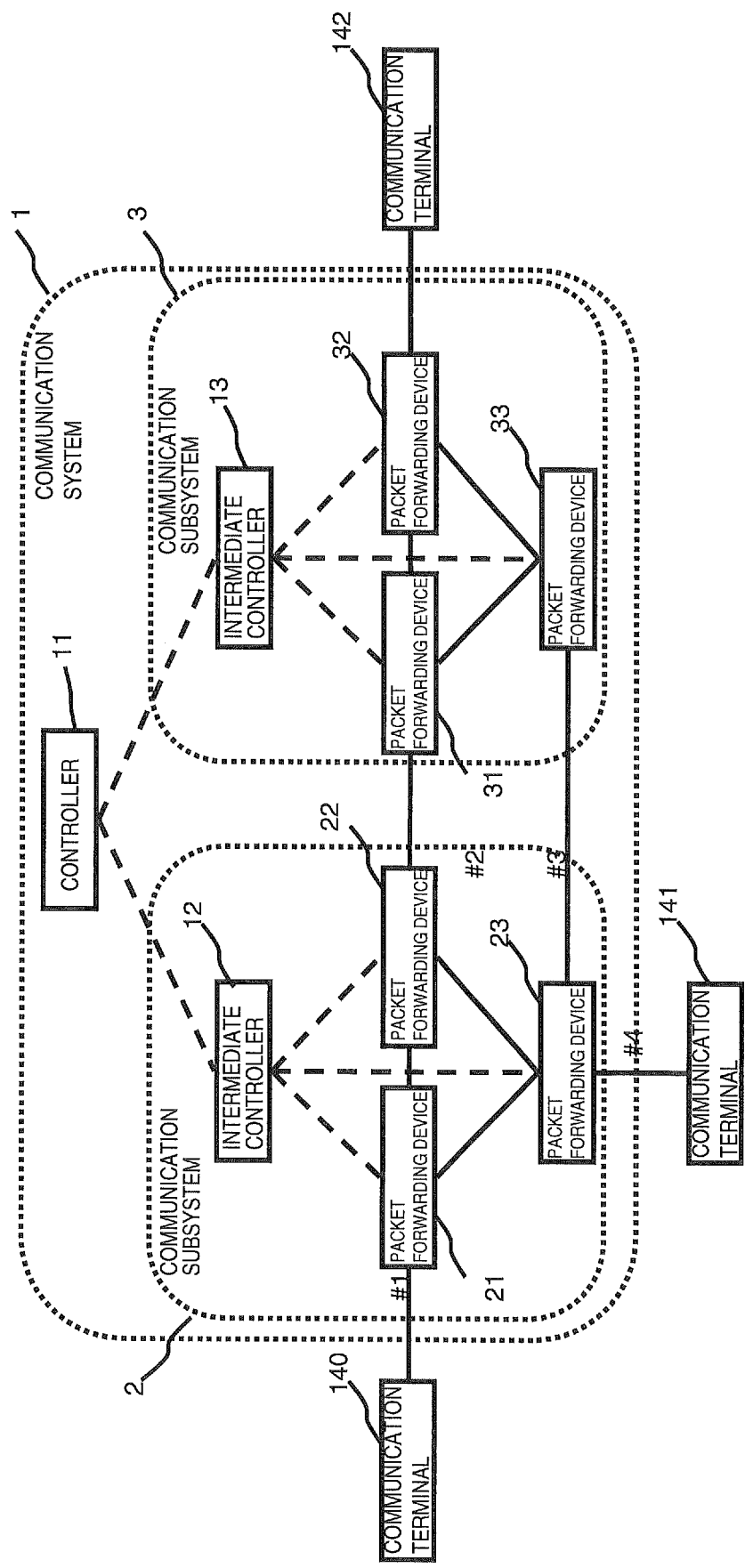
FIG. 8 is a drawing illustrating a configuration example of a communication system of a second exemplary embodiment of the present invention.

Next, a second exemplary embodiment of the present invention will be described in detail with reference to the drawings. FIG. 8 is a drawing illustrating the configuration of a communication system of the second exemplary embodiment of the present invention. FIG. 8 shows the configuration of the communication system 1 including communication subsystems 2 and 3, and a controller 11 controlling intermediate controllers 12 and 13 in these communication subsystems. Further, communication devices 140 to 142 are connected to the communication system 1.

Further, broken lines between the controller 11, the intermediate controllers 12 and 13, and packet forwarding devices 21 to 23 and 31 to 33 in FIG. 8 indicate control channels. As the control protocol, the OpenFlow protocol in Non Patent Literature 2 can be used.

Further, it is assumed that the communication subsystem 2 (or 3) is constituted by the intermediate controller 12 (or 13) and the three packet forwarding devices 21 to 23 (or 31 to 33) in the explanation below. The configuration in FIG. 8 is for simplifying the explanation of the present invention, and the numbers and the connection relations of the elements shown in FIG. 8 are not limited to the example in FIG. 8.

Figure 9:
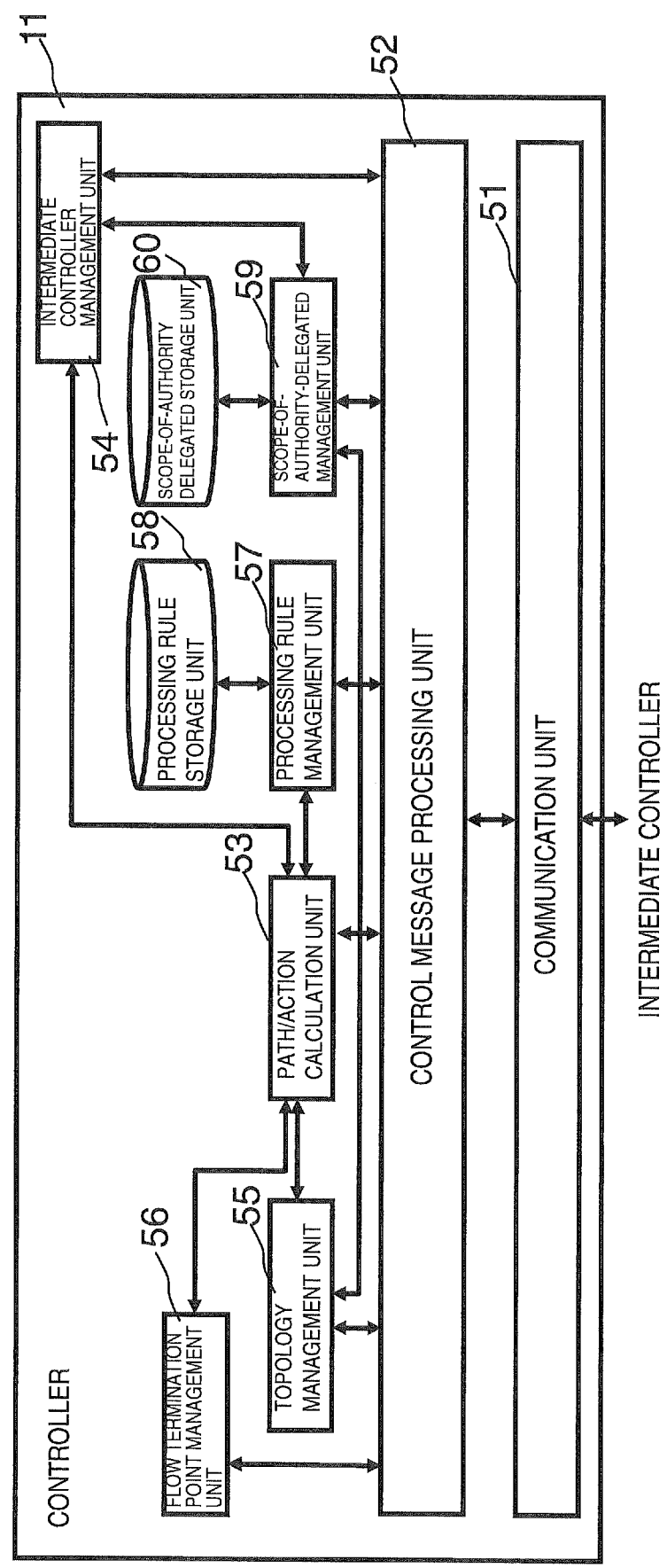
FIG. 9 is a drawing showing a configuration example of a controller of the second exemplary embodiment of the present invention.

FIG. 9 is a drawing showing a detailed configuration of the controller 11 shown in FIG. 8. FIG. 9 shows a configuration comprising a communication unit 51 that communicates with the intermediate controllers 12 and 13, a control message processing unit 52, a path/action calculation unit 53, an intermediate controller management unit 54, a topology management unit 55, a flow termination point management unit 56, a processing rule management unit 57, a processing rule storage unit 58, a scope-of-authority-delegated management unit 59, and a scope-of-authority-delegated storage unit 60. These units operate as described below.

The control message processing unit 52 analyzes a control message received from the intermediate controllers 12 and 13, and gives the control message information to corresponding processing means in the controller 11.

The path/action calculation unit 53 derives the forwarding path of a packet and an action executed by the intermediate controller operating as a virtual packet forwarding device on the forwarding path based on information about a flow termination point managed by the flow termination point management unit 56 and network topology information constructed by the topology management unit 55.

The intermediate controller management unit 54 manages the ability of the intermediate controllers 12 and 13 controlled by the controller 11 (for instance, the number and type of ports connected to the communication subsystems managed by communication terminals and other intermediate controllers, and the type(s) of actions supported, etc.).

The topology management unit 55 constructs the network topology information based on the connection relations, collected via the communication unit 51, between the communication subsystems managed by the intermediate controllers 12 and 13.

The flow termination point management unit 56 manages information for specifying the termination point of a flow occurring in the communication system 1. In the present exemplary embodiment, the flow termination point management 56 manages IP subnet information attached to a port to which a communication terminal can be connected as the information for specifying the flow termination point, however, the information managed as the flow termination point is not limited thereto. For instance, other information managed as the information for specifying the flow termination point may be the location information of external nodes (information capable of specifying which external node is connected to which port of which communication device). The information for specifying the flow termination point is managed based on, for instance, a packet forwarding ability notification and a forwarding function ability update message (described below) from the intermediate controllers 12 and 13.

The processing rule management unit 57 manages what kind of a processing rule is set in which intermediate controller. More concretely, the processing rule management unit 57 registers the result of calculation by the path/action calculation unit 53 in the processing rule storage unit 58 as a processing rule, and sets the processing rule in the intermediate controllers 12 and 13. Further, based on a processing rule setting notification and processing rule deletion notification from the intermediate controllers 12 and 13, the processing rule management unit 57 updates the corresponding contents of the processing rule storage unit 58 when the set processing rule changes in the intermediate controllers 12 and 13.

Further, if the controller 11 does not need to hold the processing rule, the processing rule storage unit 58 may be omitted. Further, a configuration in which the processing rule storage unit 58 is provided separately in an external server may be employed.

The scope-of-authority-delegated management unit 59 manages the scope of packet flows (corresponding to the "identification condition" described above; referred to as "the scope of authority delegated" hereinafter in exemplary embodiments below) in which each of the intermediate controllers 12 and 13 is permitted to autonomously control a forwarding path. More concretely, the scope-of-authority-delegated management unit 59 determines the scope of authority delegated when constructing the control channels to the intermediate controllers 12 and 13, registers it in the scope-of-authority-delegated storage unit 60, sets the scope of authority delegated in the intermediate controllers 12 and 13, and supports a situation where the scope of authority delegated changes due to changes in the topology between the communication subsystems by updating the contents of the scope-of-authority-delegated storage unit 60. Further, the scope-of-authority-delegated storage unit 60 is provided in the controller 11 in the example shown in FIG. 9, however, the scope-of-authority-delegated storage unit 60 may be provided separately in an external server.

Further, in the present exemplary embodiment, the input port information, output port information, and flow scope of the communication subsystem managed by each of the intermediate controllers 12 and 13 are used as the scope of authority delegated. The input port information is the input port information of a flow flowing into the communication subsystem. The output port information is the output port information of a flow flowing out of the communication subsystem. The flow scope is information indicating the scope of a flow flowing in the communication subsystem, specified by the source and destination MAC (Media Access Control) address, the source and destination IP address, and the source and destination L4 (layer 4) port information. The scope of authority delegated will be described in detail later using FIGS. 12 and 13.

Further, in the present exemplary embodiment, the scope-of-authority-delegated management unit 59 has a policy for creating the scope of authority delegated that permits the intermediate controllers 12 and 13 to control the forwarding path of any communication within the communication subsystems.

The controller 11 described above can be realized with a configuration in which the intermediate controller management unit 54 and the scope-of-authority-delegated management unit 59 are added to the OpenFlow controller described in Non Patent Literature 1 as a base.

Further, each unit (processing means) of the controller 11 shown in FIG. 9 can be realized by a computer program having a computer constituting the controller 11 execute each processing described above using the hardware thereof. The program may be recorded on a non-transient recording medium which is computer readable. In such a case the program operates the computer as a functional unit (or means) that operates the intended (programmed) processing or steps, as a whole constituting the controller.

Figure 10:
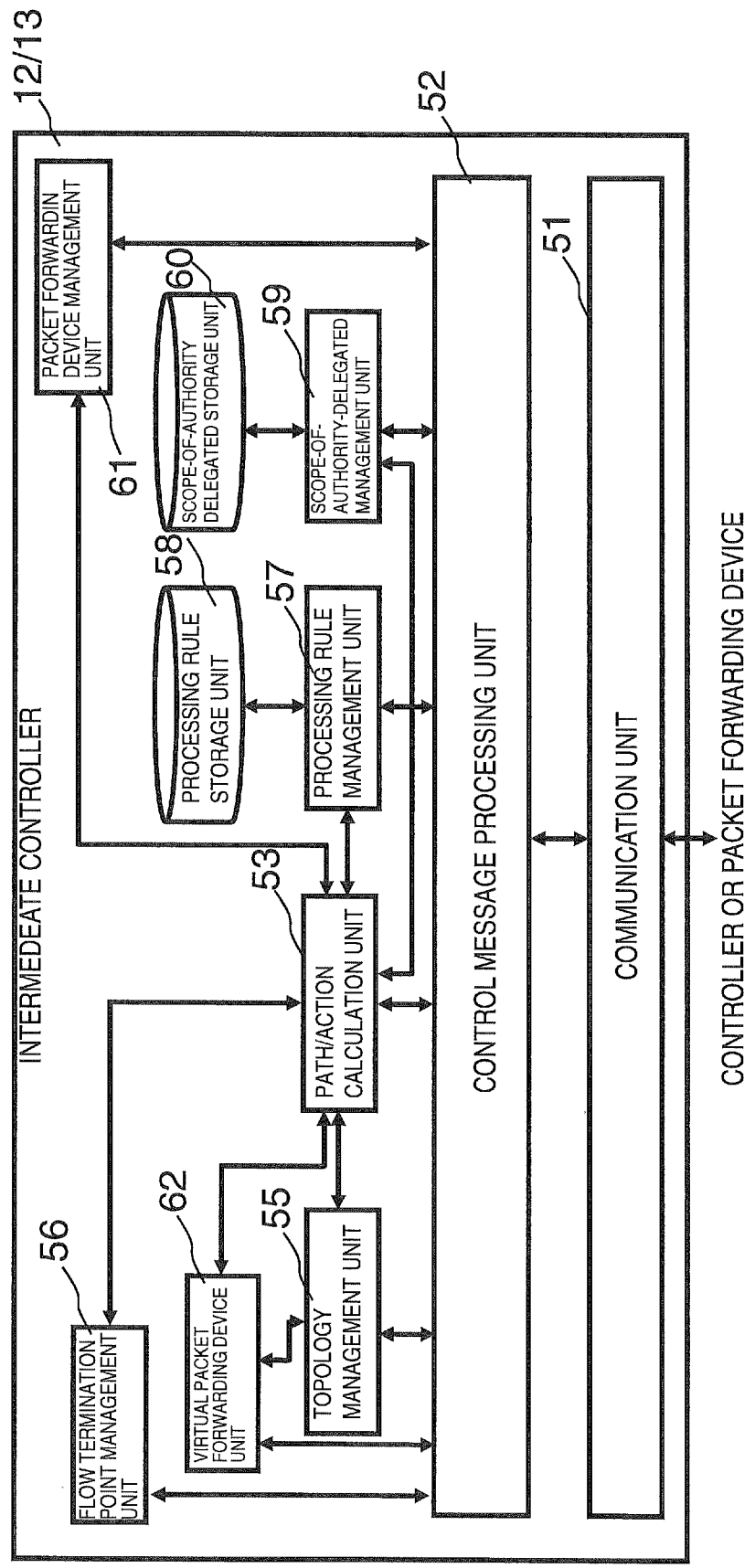
FIG. 10 is a drawing showing a configuration example of an intermediate controller of the second exemplary embodiment of the present invention.

FIG. 10 is a drawing illustrating a detailed configuration of the intermediate controller 12 (or 13) shown in FIG. 2. FIG. 10 shows a configuration comprising the communication unit 51 that communicates with the packet forwarding devices 21 to 23 and 31 to 33, the control message processing unit 52, the path/action calculation unit 53, a packet forwarding device management unit 61, the topology management unit 55, the flow termination point management unit 56, the processing rule management unit 57, the processing rule storage unit 58, the scope-of-authority-delegated management unit 59, the scope-of-authority-delegated storage unit 60, and a virtual packet forwarding device unit 62. These units operate as described below.

The control message processing unit 52 analyzes a control message received from the packet forwarding devices 21 to 23 and 31 to 33, and gives control message information to corresponding processing means in the intermediate controller 12 (or 13).

The path/action calculation unit 53 confirms whether or not a newly detected packet flow belongs to the scope of authority delegated managed by the scope-of-authority-delegated management unit 59 based on a request for setting a processing rule by a new flow detection notification (Packet-In) message from the packet forwarding device, and when it does, the path/action calculation unit 53 derives the forwarding path of the packet and an action executed by the packet forwarding device on the forwarding path based on information about a flow termination point managed by the flow termination point management unit 56 and network topology information constructed by the topology management unit 55. On the other hand, when the newly detected packet flow does not belong to the scope of authority delegated, the path/action calculation unit 53 requests the controller 11 to set a processing rule in cooperation with the virtual packet forwarding device unit 62. Further, the path/action calculation unit 53 derives the forwarding path of the packet and the action executed by the packet forwarding device on the forwarding path according to a processing rule received from the controller 11, following an instruction for setting a processing rule received from the controller 11 via the virtual packet forwarding device unit 62.

The packet forwarding device management unit 61 manages the ability of the packet forwarding device controlled by the intermediate controller 12 (or 13) (for instance, the number and type of ports, and the types of actions supported, etc.).

The topology management unit 55 constructs the network topology information based on the connection relations of packet forwarding functions collected via the communication unit 51.

The flow termination point management 56 manages information for specifying the termination point of a flow occurring in the communication subsystem. In the present exemplary embodiment, the flow termination point management 56 manages IP subnet information attached to a port to which a communication terminal can be connected as the information for specifying the flow termination point, however, the information managed as the flow termination point is not limited thereto as in the case of the controller 11. The information for specifying the flow termination point is suitably updated based on, for instance, the forwarding function ability notification message (described later) from the packet forwarding device.

The processing rule management unit 57 manages what kind of a processing rule is set in which packet forwarding device. More concretely, the processing rule management unit 57 registers the result of calculation by the path/action calculation unit 53 in the processing rule storage unit 58 as a processing rule, and sets the processing rule in the corresponding packet forwarding device. Further, based on a processing rule deletion notification from the packet forwarding device, the processing rule management unit 57 updates the corresponding contents of the processing rule storage unit 58 when the set processing rule changes in the packet forwarding device.

Further, if the intermediate controller 12 (or 13) does not need to hold the processing rule, the processing rule storage unit 58 may be omitted. Further, a configuration in which the processing rule storage unit 58 is provided separately in an external server may be employed.

The scope-of-authority-delegated management unit 59 manages the scope of authority delegated by the controller 11. More concretely, the scope-of-authority-delegated management unit 59 registers the scope of delegated authority notified when the control channel to the controller 11 is constructed in the scope-of-authority-delegated storage unit 60. Further, the scope-of-authority-delegated management unit 59 updates the corresponding contents of the scope-of-authority-delegated storage unit 60 when the controller 11 updates the scope of authority delegated due to changes in the topology between the communication subsystems. Note that the scope-of-authority-delegated storage unit 60 may be provided separately in an external server.

Further, in the present exemplary embodiment, the input port information, output port information, and flow scope of the communication subsystem managed by each of the intermediate controllers 12 and 13 are used as the scope of authority delegated. The input port information is the input port information of a flow flowing into the communication subsystem. The output port information is the output port information of a flow flowing out of the communication subsystem. The flow scope is information indicating the scope of a flow flowing in the communication subsystem, specified by the source and destination MAC (Media Access Control) address, the source and destination IP address, and the source and destination L4 (layer 4) port information. The scope of authority delegated will be described in detail later using FIGS. 12 and 13.

The virtual packet forwarding device unit 62 manages the communication subsystem 2 (or 3) constituted by one or more packet forwarding devices 21 to 23 (or 31 to 33) as one logic packet forwarding device. More concretely, in cooperation with the packet forwarding device management unit 61 and the topology management unit 55, the virtual packet forwarding device unit 62 detects port groups connectable to external communication functions (for instance, communication terminals and packet forwarding devices belonging to other communication subsystem) and forms a virtual packet forwarding device equipped with these port groups. When the intermediate controller 12 (or 13) constructs a control channel to the controller 11, the virtual packet forwarding device unit 62 notifies the packet forwarding ability to the controller 11 with the communication subsystem 2 (or 3) managed by the intermediate controller 12 (or 13) as one virtual packet forwarding device. Further, the virtual packet forwarding device unit 62 requests the controller 11 to set a processing rule based on a request from the path/action calculation unit 53. Further, when receiving a processing rule setting message from the controller 11, the virtual packet forwarding device unit 62 converts the message for the communication subsystem and requests the path/action calculation unit 53 to set a processing rule.

The intermediate controller 12 (or 13) described above can be realized with a configuration in which the scope-of-authority-delegated management unit 59 and the virtual packet forwarding device unit 62 are added to the OpenFlow controller described in Non Patent Literature 1 as a base.

Further, each unit (processing means) of the intermediate controller 12 (or 13) shown in FIG. 10 can be realized by a computer program having a computer constituting the intermediate controller 12 (or 13) execute each processing described above using the hardware thereof. The program may be recorded on a non-transient recording medium which is computer readable. In such a case the program operates the computer as a functional unit (or means) that operates the intended (programmed) processing or steps, as a whole constituting the controller.

When receiving a packet, the packet forwarding devices 21 to 23 and 31 to 33 search for a processing rule entry having a matching rule matching the received packet in the processing rule storage unit storing processing rules, and perform processing (for instance, forwarding to a specific port, flooding, discarding, etc.) according to an action attached to the processing rule.

Further, the packet forwarding devices 21 to 23 and 31 to 33 reset a timer (time-out information) in an action field of the corresponding processing rule entry every time they process a packet. As soon as the timer indicates "0," the packet forwarding devices 21 to 23 and 31 to 33 delete the corresponding processing rule entry from the processing rule storage unit. This will prevent processing rules no longer used from remaining indefinitely and unintended actions from being executed.

Further, the packet forwarding devices 21 to 23 and 31 to 33 described above can be realized with the same configuration as the OpenFlow switch in Non Patent Literature 1.

Next, the overall operation of the present exemplary embodiment will be described in detail with reference to the drawings. A series of steps in which the intermediate controller 12 constructs the control channel to the packet forwarding devices 21 to 23 and a series of steps in which the intermediate controller 12 constructs the control channel to the controller 11 will be described.

Figure 11:
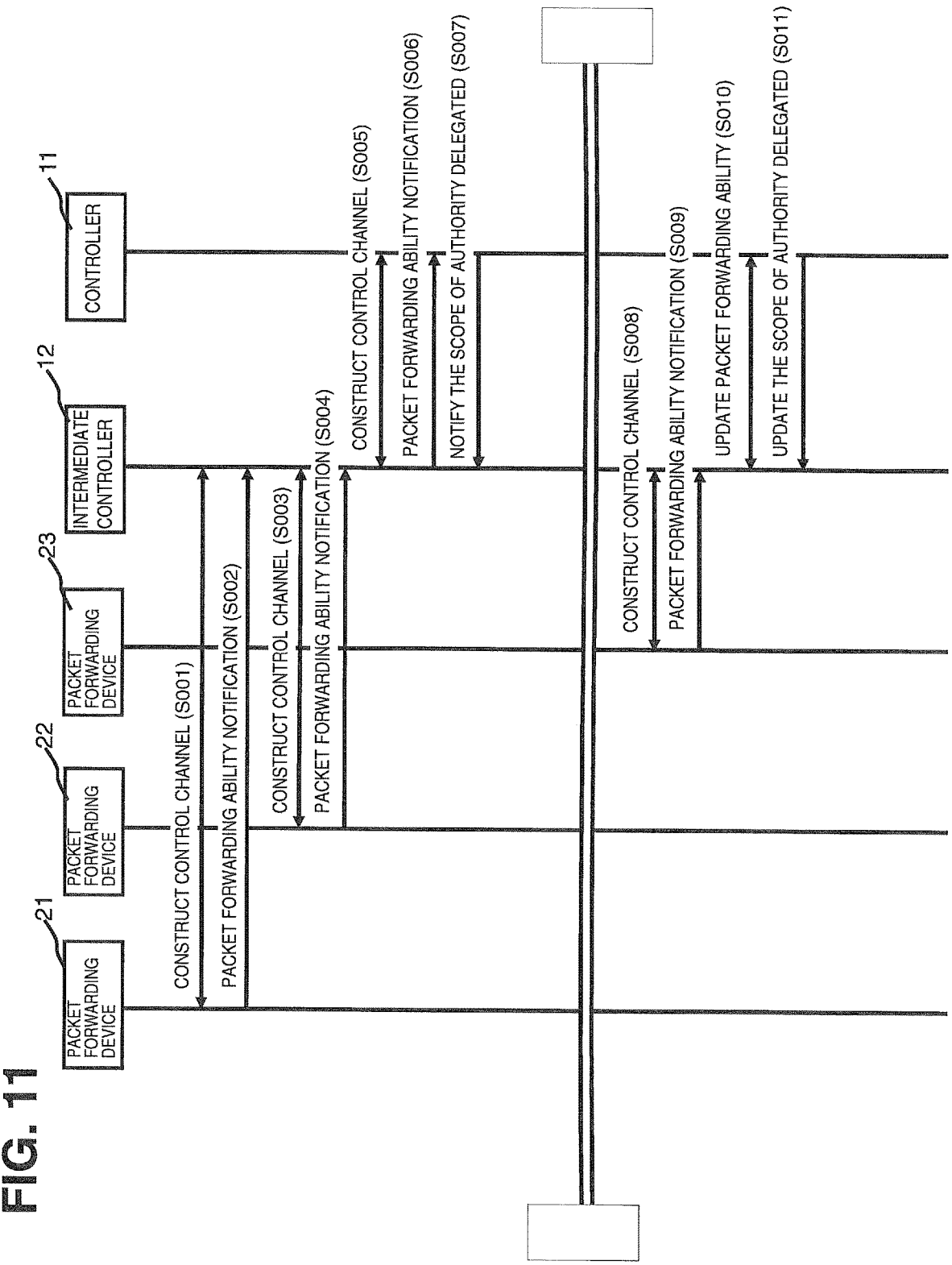
FIG. 11 is a sequence diagram showing an operation example (notification of a scope of authority delegated) of the second exemplary embodiment of the present invention.

FIG. 11 is a sequence diagram showing the operation (the notification of the scope of authority delegated) of the second exemplary embodiment of the present invention. With reference to FIG. 11, first the intermediate controller 12 constructs the control channel to the packet forwarding devices 21 and 22 (steps S001 and S003) and then constructs the control channel to the controller 11 (step S005). Further, in the example shown in FIG. 11, the intermediate controller 12 constructs the control channel to the packet forwarding device 23 thereafter (step S008), changing the configuration of the communication subsystem 2, and notifies this change to the controller 11 (step S010).

Steps in which the intermediate controller 12 constructs each control channel and a procedure thereafter will be described below, following the sequence in FIG. 11. The packet forwarding device 21 connects to the communication subsystem 2 and constructs the control channel to the intermediate controller 12 (the step S001). The control channel established here is, for instance, a TCP (Transmission Control Protocol) or SSL (Secure Sockets Layer) connection using a port number for the control channel. Then, the packet forwarding device 21 notifies information about itself to the intermediate controller 12 through a forwarding ability notification message (step S002).

Here, examples of the information sent by the packet forwarding device 21 are an identifier of the packet forwarding device itself (the packet forwarding device 21 in this case), information about each port, and information about supported actions. As an identifier of the packet forwarding device, an IP address may be sent, for instance. An IP address is an example of an identifier of the packet forwarding device and information other than an IP address may be sent as an identifier. Examples of the port information are a port identifier of each port of the packet forwarding device, the type of a link connected to each port, and information relating to the type of a link connected to each port. For instance, a port number can be used as a port identifier. The link type information is, for instance, information indicating link types having different frame types such as Ethernet (registered trademark) and fiber channel. The contents of the information relating to a link changes, depending on the type of the link. For instance, when the type of a link is Ethernet, examples of the information relating to the link are a MAC address, communication speed supported, and communication method (for instance, full duplex, half duplex, etc.). The information relating to a link may be called link attribute information. Examples of the action information are MAC address translation, IP address translation, and L4 port number translation, in addition to normal packet forwarding.

Further, as the forwarding ability notification message, a Feature Reply message sent as a response to a Feature Request in Non Patent Literature 2 can be used.

Upon receiving the forwarding ability notification message from the packet forwarding device 21, the intermediate controller 12 stores the contents thereof in the packet forwarding device management unit 61.

Then, the intermediate controller 12 constructs the control channel to the packet forwarding device 22, following the same procedure, and stores the forwarding ability of the packet forwarding device 22 in the packet forwarding device management unit 61 (the steps S003 and S004).

Next, the intermediate controller 12 searches the topology of the communication subsystem 2 as advance preparation for constructing the control channel to the controller 11, and stores the result in the topology management unit 55 (omitted in FIG. 1). Once the topology information has been updated, the virtual packet forwarding device unit 62 forms the communication subsystem 2 constructed by the packet forwarding devices 21 and 22 as one virtual packet forwarding device. The virtual packet forwarding device formed here has two ports. One of the ports is a port used by the communication subsystem 2 to connect to the communication terminal 140 in FIG. 8, and the other port is used by the communication subsystem 2 to connect to the packet forwarding device 31. Here, it is assumed that 1 and 2 are given to them as port numbers.

After forming the virtual packet forwarding device with itself and the packet forwarding device constituting the communication subsystem 2, the intermediate controller 12 constructs the control channel to the controller 11 (step S005), and notifies information relating to the virtual packet forwarding device to the controller 11 through the forwarding ability notification message (step S006). At this time, the intermediate controller 12 notifies the fact that it is an intermediate controller.

Upon obtaining the information relating to the virtual packet forwarding device of the intermediate controller 12, the controller 11 stores the information in the intermediate controller management unit 54. Then, when the virtual packet forwarding device information of the intermediate controller 12 is newly registered or updated, the scope-of-authority-delegated management unit 59 in the controller 11 determines the scope of authority delegated in which the intermediate controller 12 can freely control a path, and notifies this scope of authority delegated to the intermediate controller 12 through a scope-of-authority-delegated massage (step S007).

In the present exemplary embodiment, the scope of authority delegated, shown in FIG. 12, is notified in the step S007. In the example shown in FIG. 12, based on the information relating to the virtual packet forwarding device having "1" and "2" as port numbers, the scope of authority delegated in which the input port information and the output port information are both "1" and the flow scope is "Any," which does not specify any target, is notified.

Upon obtaining the scope of authority delegated, the intermediate controller 12 stores it in the scope-of-authority-delegated management unit 59.

Then, when the packet forwarding device 23 attempts to construct the control channel to the intermediate controller 12, the intermediate controller 12 constructs the control channel to the packet forwarding device 23, following the same procedure as the packet forwarding devices 21 and 22 (the step S008), and stores the forwarding ability of the packet forwarding device 23 in the packet forwarding device management unit 61 (step S009). Then, the intermediate controller 12 searches the topology again, and upon detecting an update of the topology information, the intermediate controller 12 forms the virtual packet forwarding device again and notifies the latest information relating to the virtual packet forwarding device to the controller 11 (the step S010).

The virtual packet forwarding device formed here has four ports. The first port connects to the communication terminal 140 in FIG. 8, the second port connects to the packet forwarding device 31, the third port connects to the packet forwarding device 33, and the fourth port connects to the communication terminal 141. Here, it is assumed that 1 through 4 are given to each of the ports as port numbers.

When detecting an update of the information relating to the virtual packet forwarding device of the intermediate controller 12, the controller 11 re-determines the scope of authority delegated, and notifies this scope of authority delegated to the intermediate controller 12 through the scope-of-authority-delegated massage (step S011).

In the present exemplary embodiment, the scope of authority delegated, shown in FIG. 13, is notified in the step S011. In the example shown in FIG. 13, based on the information relating to the virtual packet forwarding device in which "3" and "4" are added to "1" and "2" as the previous port numbers, the scope of authority delegated in which both the input port information and the output port information are "1" and "4," and the flow scope is "Any," which does not specify any target, is notified. In other words, in the present exemplary embodiment, the authority that permits the intermediate controller 12 to autonomously determine the forwarding path of any communication closed within the communication subsystem (communication between communication terminals completed within the communication subsystem) is delegated.

Figure 14:
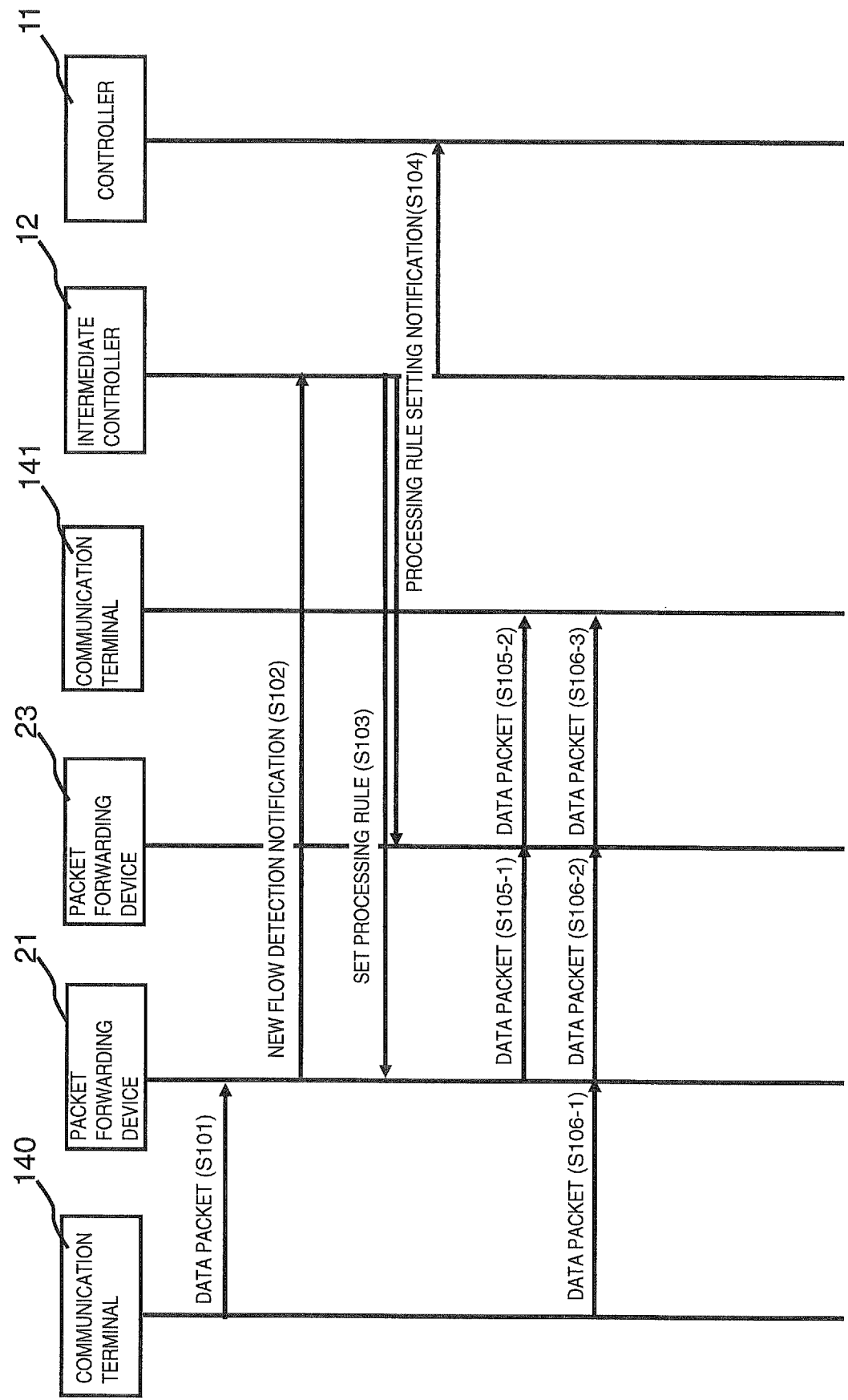
FIG. 14 is a sequence diagram showing an operation example (packet forwarding within the scope of authority delegated) of the second exemplary embodiment of the present invention.

Next, the flow of communication after the control channel has been constructed will be described. FIG. 14 is a sequence diagram showing the flow of communication between the communication terminals 140 and 141 shown in FIG. 8. Note that the communication terminals 140 and 141 in FIG. 8 are connected to the packet forwarding devices 21 and 23, respectively, in the communication system 2. In other words, the communication between the communication terminals 140 and 141 is closed within the communication subsystem.

With reference to FIG. 14, first, the communication terminal 140 sends a data packet to the communication terminal 141 (step S101). Upon receiving the data packet, the packet forwarding device 21 refers to the processing rule storage unit and searches a processing rule entry matching the received packet. However, since this packet is the first packet sent from the communication terminal 140 to the communication terminal 141, there is no matching processing rule. Therefore, the packet forwarding device 21 buffers the received packet and sends the new flow detection notification (Packet-In message) to the intermediate controller 12 (step S102).

This new flow detection notification includes information required for creating a processing rule (for instance, MAC address, IP address, port number (each including the sender's and the receiver's) and packet receiving port information.

Further, the packet forwarding device 21 buffers the received packet and sends only the information required for creating a processing rule to the intermediate controller 12 in the step S102 described above, however, the packet forwarding device 21 may simply send the received packet to the intermediate controller 12.

Figure 15:
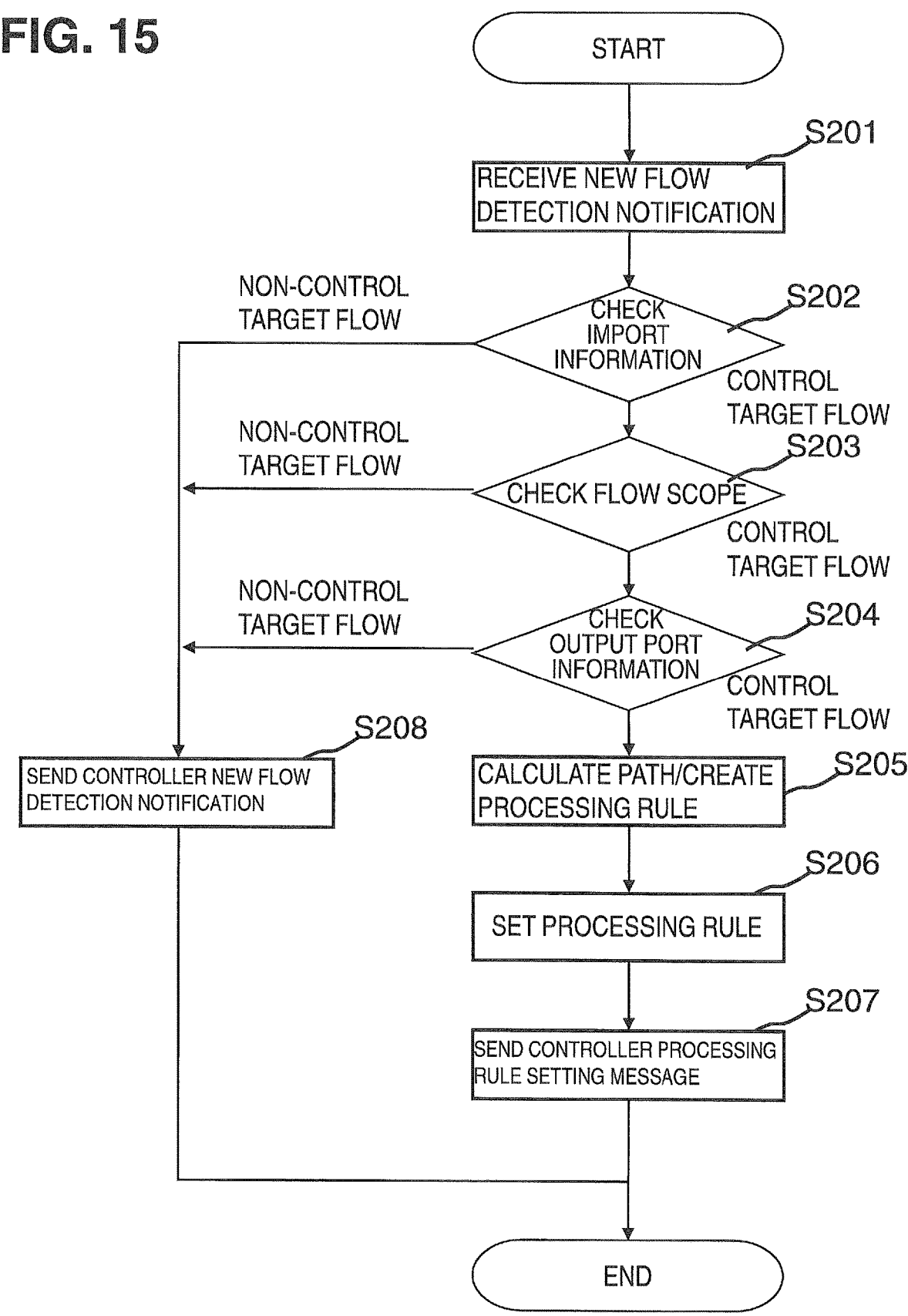
FIG. 15 is a flowchart showing an operation example of the intermediate controller of the second exemplary embodiment of the present invention.

Upon receiving the new flow detection notification, the intermediate controller 12 determines whether or not the packet flow is a flow that should be controlled by the intermediate controller 12, and calculates and creates a path, as shown in FIG. 15. Here, since the communication between the communication terminals 140 and 141 is closed within the communication subsystem as described above, the intermediate controller 12 sets processing rules in the packet forwarding devices 21 and 23, the packet forwarding devices on the path (step S103). A Flow Modification message in Non Patent Literature 2 may be used for setting the processing rules.

Further, the intermediate controller 12 notifies the processing rule set to the controller 11 as the processing rule setting notification. It is preferable that the processing rule notified here be converted into a processing rule corresponding to the virtual packet forwarding device formed by the virtual packet forwarding device unit 62.

After the processing rules have been set in the packet forwarding devices 21 and 23, the packet forwarding device 21 forwards the buffered packet according to the contents of an action field in the processing rule. This packet is forwarded in the order of the packet forwarding devices 21 and 23 and reaches the communication terminal 141 since the processing rule has been already set in the packet forwarding device 23 following the packet forwarding device 21 on the forwarding path of this packet.

The operation of the intermediate controller 12 that has received the new flow detection notification will be described here. FIG. 15 is a flowchart showing the operation of the intermediate controller 12 that has received the new flow detection notification.

With reference to FIG. 15, upon receiving the new flow detection notification (step S201), the intermediate controller 12 specifies the packet forwarding device that has detected the new flow and an input port thereof from the information included in the new flow detection notification, and checks whether or not the input port belongs to the input port information defined in the scope of authority delegated (step S202). The packet forwarding device that has detected the new flow is the packet forwarding device 21, and the input port thereof is a port having the port number "1" connected to the communication terminal 140. Therefore, the flow is determined to be within the scope of authority delegated (a control target flow) in the step S202.

Next, the intermediate controller 12 checks whether or not a data packet subsequently received is within the flow scope defined in the scope of authority delegated (step S203). Since the flow scope is set to "Any," which does not specify any target, as shown in FIG. 13, the data packet is determined to be within the scope of authority delegated (a control target flow) in the step S203.

Next, the intermediate controller 12 checks whether or not the output destination of the data packet specified from the management information of the flow termination point management unit 56 and the destination IP address of the received data packet belongs to the output port defined in the scope of authority delegated (step S204). The destination of the data packet is the terminal device 141 and the output destination is a port having the port number "4" of the packet forwarding device 23 connected to the communication terminal 141. Therefore, the output destination of the data packet is determined to be within the scope of authority delegated (a control target flow) in the step S204.

Upon determining that the received data packet is within the scope of authority delegated (a control target flow) as described, the intermediate controller 12 calculates a path and creates a processing rule (step S205). Here, it is assumed that a path in which the packet is forwarded in the order of the packet forwarding devices 21 and 23 is calculated as the result of the calculation. Further, it is assumed that the intermediate controller 12 creates a processing rule having a matching rule that requires the source MAC address and the source IP address to be those of the communication terminal 140 and the destination MAC address and the destination IP address to be those of the communication terminal 141, and having an action, in which a corresponding packet is forwarded along a calculated path, executed.

Then, the intermediate controller 12 sets the processing rule created (step S206) and sends the processing rule setting notification to the controller 11 (step S207). Additionally, the intermediate controller 12 registers the processing rule set in the packet forwarding devices 21 and 23 in the processing rule storage unit 58 via the processing rule management unit 57.

If any one of the items is determined not to be within the scope of authority delegated (control target flow) in the steps S202 to S204, the intermediate controller 12 sends the new flow detection notification to the controller 11. It is preferable that the identification information and the input port information of the packet forwarding device included in this new flow detection notification be converted into information corresponding to the virtual packet forwarding device formed by the virtual packet forwarding device unit 62 of the intermediate controller 12. As for the operation thereafter, the controller 11 calculates the forwarding path of the packet, and creates and sets a processing rule in each packet forwarding device as described using FIG. 21 at the beginning.

Figure 16:
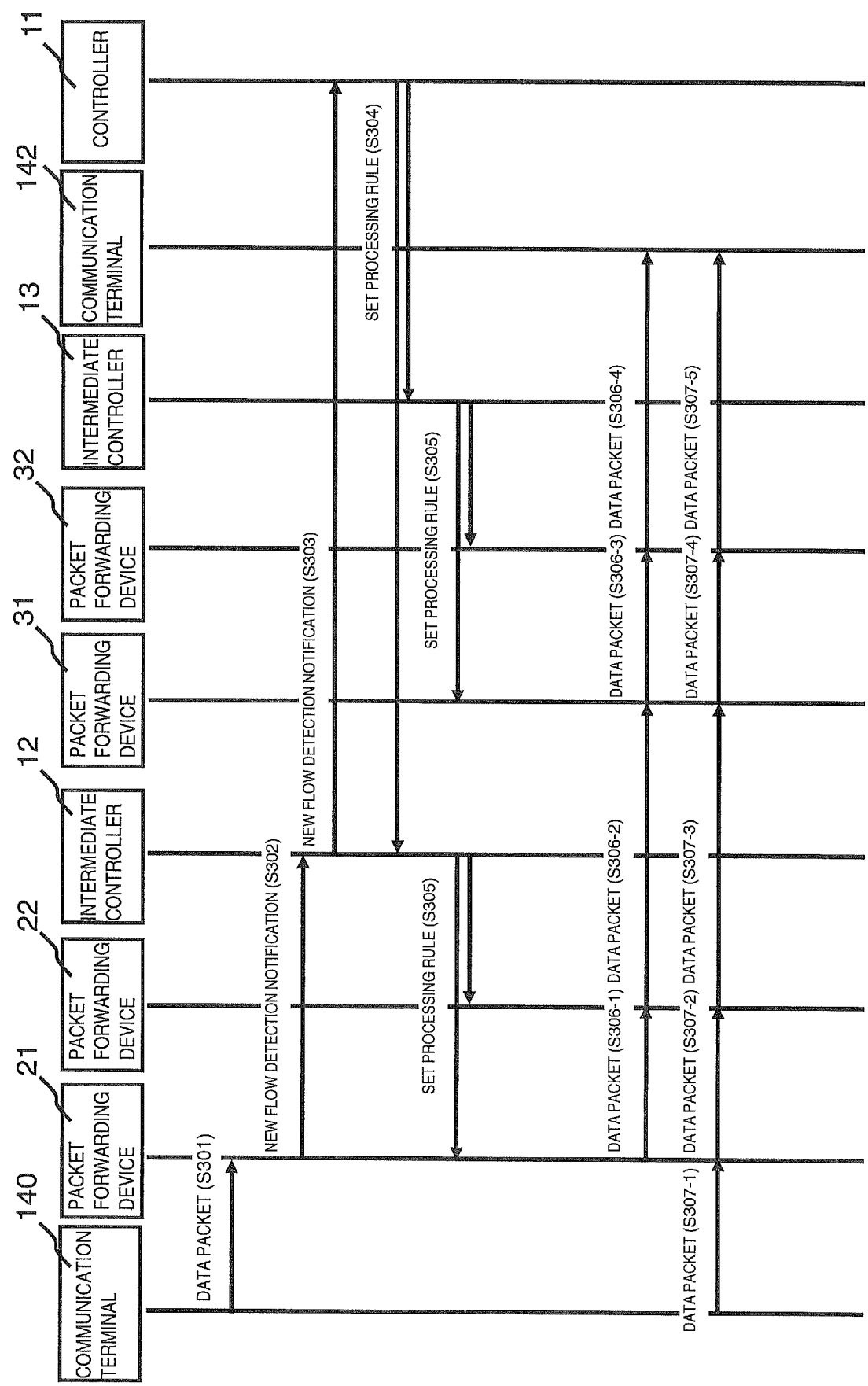
FIG. 16 is a sequence diagram showing an operation example (packet forwarding outside the scope of authority delegated) of the second exemplary embodiment of the present invention.

Next, with reference to FIG. 16, it is a sequence diagram showing a flow of communication between the communication terminals 140 and 142 in FIG. 8. The communication terminal 140 in FIG. 8 is connected to the packet forwarding device 21 of the communication subsystem 2, and it should be note that the communication terminal 142 in FIG. 8 is connected to the packet forwarding device 32 of the communication subsystem 3. In other words, the communication between the communication terminals 140 and 142 is not closed within a communication subsystem.

First, the communication terminal 140 sends a data packet to the communication terminal 142 (step S301). Since there is no matching processing rule in this case, either, the packet forwarding device 21 buffers the received packet as in the case of FIG. 13, and sends the new flow detection notification to the intermediate controller 12 (step S302).

Upon receiving the new flow detection notification, the intermediate controller 12 determines whether or not the packet flow is a flow that should be controlled by the intermediate controller 12, as shown in the flowchart in FIG. 15. Since the communication between the communication terminals 140 and 142 is not closed within a communication subsystem as mentioned before (the output port is outside the scope of authority of the intermediate controller 12), the intermediate controller 12 sends the new flow detection notification to the controller 11 as indicated in step S208 in FIG. 15 (step S303).

Further, it is preferable that the identification information and the input port information of the packet forwarding device included in this new flow detection notification be converted into information corresponding to the virtual packet forwarding device formed by the virtual packet forwarding device unit 62 of the intermediate controller 12.

Since the controller 11 recognizes each of the communication subsystems 2 and 3 as one single virtual packet forwarding device, the controller 11 calculates the forwarding path of the packet and newly creates a processing rule to be set, upon receiving the new flow detection notification. Here, it is assumed that a path in which the packet is forwarded in the order of the virtual packet forwarding device corresponding to the communication subsystem 2 and the virtual packet forwarding device corresponding to the communication subsystem 3 is calculated as the result of the path calculation. Further, it is assumed that the controller 11 decides on a matching rule stating that the source MAC address and the source IP address are those of the communication terminal 140 and that the destination MAC address and the destination IP address are those of the communication terminal 142, and creates a processing rule having an action that forwards the packet along the calculated path.

The controller 11 sets the created processing rule in the intermediate controllers 12 and 13, which are intermediate controllers on the packet forwarding path (step S304). The controller 11 registers the set processing rule in the processing rule storage unit 58 via the processing rule management unit 57.

Upon receiving a processing rule setting message from the controller 11, the intermediate controllers 12 and 13 convert the processing rule for the communication subsystem controlled by themselves using the virtual packet forwarding device unit 62 and the path/action calculation unit 53 (conversion from a processing rule of the virtual packet forwarding device into a processing rule of the actual and individual packet forwarding devices), and set the converted processing rule in the packet forwarding devices (step S305).

After the processing rules have been set in the packet forwarding devices, the packet forwarding device 21 forwards the buffered packet according to the processing rule (step S306-1). This packet is forwarded in the order of the packet forwarding devices 21, 22, 31, and 32 and reaches the communication terminal 142 since the processing rule has been already set in the packet forwarding devices on the forwarding path of this packet (steps S306-2 to 306-4). Similarly, a subsequent packet flow is forwarded according to the set processing rule (steps S307-1 to 307-4).

As described, according to the present exemplary embodiment, the control load of the controller per unit can be reduced (a first effect). The reason is that the controllers are layered and decentralized so as to distribute the load for controlling the forwarding paths of packets among a plurality of controllers.

Further, according to the present exemplary embodiment, the path control of a packet flow that cannot be, or should not be, calculated by using only local network information held by a low-rank controller can be realized (a second effect). The reason is that a high-rank controller specifies a scope that can be, or should be, addressed with the local network information held by the low-rank controller as the scope in which the low-rank controller is permitted to control a path (the scope of authority delegated), and the high-rank controller controls paths exceeding this scope.

Further, according to the present exemplary embodiment, detailed path control can be realized (a third effect). The reason is that the high-rank controller controls paths on the communication subsystem level and specifies only the input and output of a packet flow (refer to the descriptions above relating to the virtual packet forwarding device), and the low-rank controller can perform more detailed path control due to the fact that the high-rank controller only specifies the scope of authority delegated, in which the low-rank controller is permitted to control a path, without specifying how to deal with each individual packet flow. At this time, by having the low-rank controllers perform path control taking into account a network status in the scope managed by each low-rank controller, path control taking into account a network status that changes momentarily can be realized.

Further, according to the present exemplary embodiment, since the high-rank controller specifies the input and output of a packet flow based on a processing rule (flow entry) setting message and the intermediate controller that has received this specification controls the packet forwarding device based on the processing rule (flow entry) setting message, the high-rank controller can be basically configured as the OpenFlow controller and the OpenFlow switch in Non Patent Literature 2 if there is no need to determine whether or not the connected packet forwarding device is a virtual device.

Further, the basic configuration of the OpenFlow switch in Non Patent Literature 2 can be employed for the packet forwarding devices.

THIRD EXEMPLARY EMBODIMENT

Figure 17:
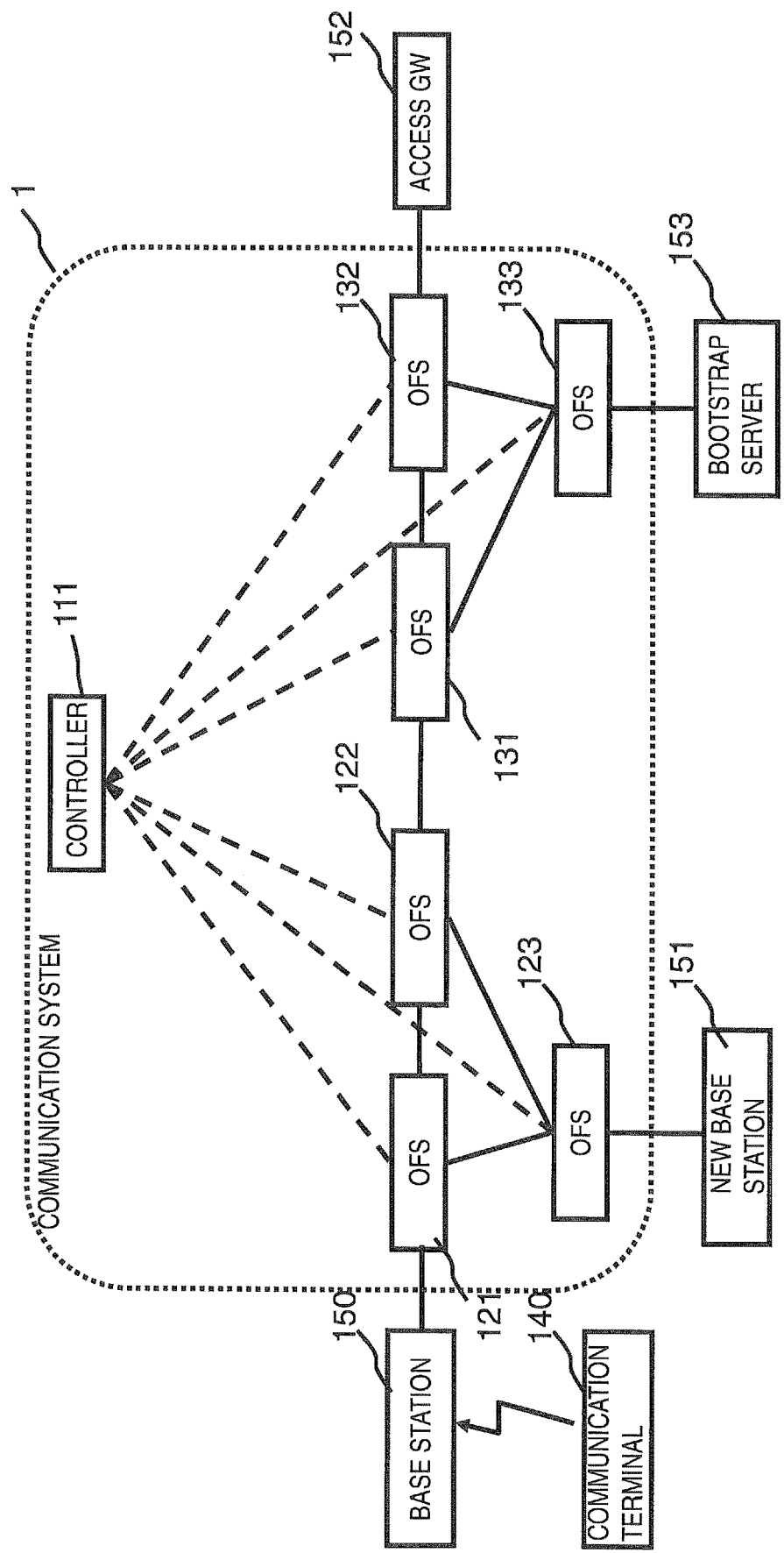
FIG. 17 is a drawing for explaining a third exemplary embodiment of the present invention.

Next, a third exemplary embodiment in which the present invention is applied to a mobile backhaul system will be described in detail with reference to the drawing. FIG. 17 is a drawing for explaining the third exemplary embodiment of the present invention.

With reference to FIG. 17, in a communication system 1 of the third exemplary embodiment of the present invention, a controller 111 corresponding to the controllers 11 and 100 in the first and the second exemplary embodiments, and OFSs 121 to 123 and 131 to 133 having the functions of the communication device, the packet forwarding device, and the intermediate controller of the first and the second exemplary embodiments are shown.

To the communication system 1 of the present exemplary embodiment, a base station 150 supporting wireless technologies such as Long Term Evolution (LTE) and WiMax, an access Gateway (GW) 152 providing communication services to communication terminals in cooperation with the base station 150, and a bootstrap server 153 remotely setting a new base station 151 when the base station is added are connected.

Here, a packet whose type is data packet is within the scope of authority delegated to the OFS operating as the intermediate controller. In detail, the input port information is "Any," the output port information is "Any," and the flow scope states either a packet flow having "17" as a protocol number in the IP header indicating User Datagram Protocol (UDP) and having "2152" as a destination port number in order to identify a data packet of GPRS Tunneling Protocol (GTP) flowing through the backhaul of LTE, or a flow having "47" as a protocol number in the IP header indicating Generic Routing Encapsulation (GRE) in order to identify a GRE packet flowing through the backhaul of WiMax.

The path control policy of each OFS, operating as the intermediate controller, for these packets is to forward them using a path control protocol such as Open Shortest Path First (OSPF) and based on a routing table constructed in cooperation with the surrounding OFSs.

According to the third exemplary embodiment of the present invention described above, control in which each OFS performs autonomous and decentralized control of the paths of data packets flowing through a backhaul system (for instance, GTP or GRE data packets exchanged between the base station 150 and the access GW 152 in FIG. 17), and when other kinds of traffic occur (for instance, traffic for the new base station 151 to access the bootstrap server 153 when the new base station 151 is added, or traffic from a terminal making illegal access), the high-rank controller 111 sets a path after determining whether or not the communication is permitted and permitting the communication becomes possible. In other words, the scope of authority may be delegated according to the type of traffic, unlike the second exemplary embodiment in which the scope of authority is delegated based on the end points of communication, i.e., whether or not communication is closed within a communication subsystem.

FOURTH EXEMPLARY EMBODIMENT

Figure 18:
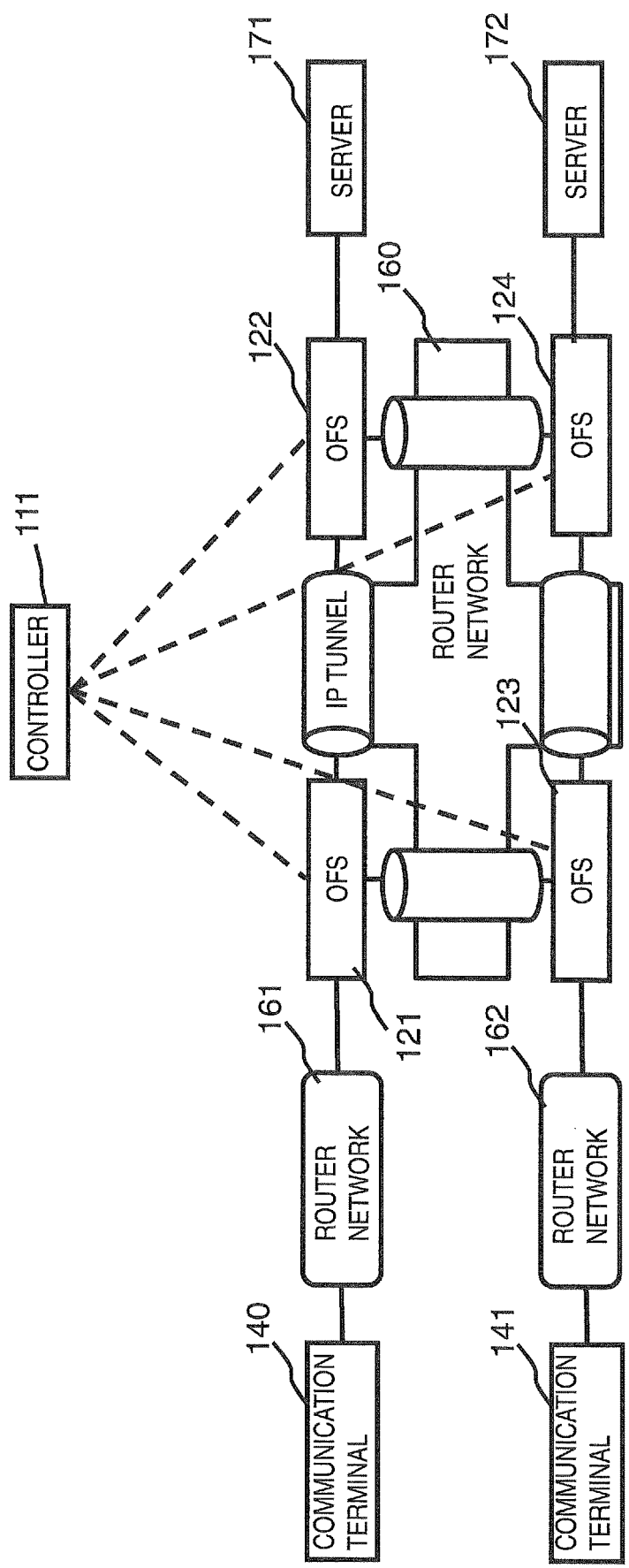
FIG. 18 is a drawing for explaining a fourth exemplary embodiment of the present invention.
Figure 20:
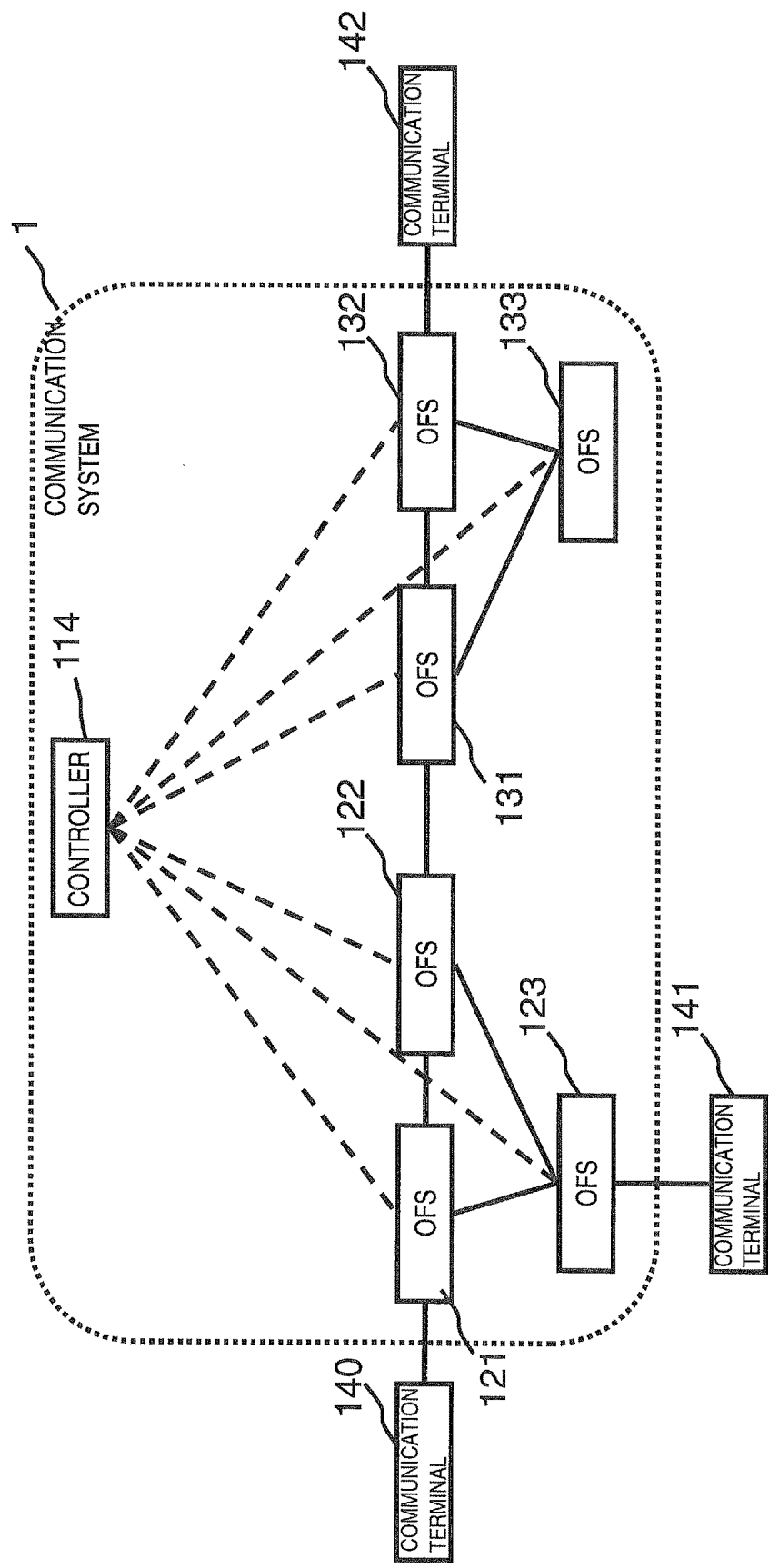
FIG. 20 is a drawing for explaining a configuration example of communication systems of Non Patent Literatures 1 and 2.

Next, a fourth exemplary embodiment in which the present invention is applied to a widely distributed data center system will be described in detail with reference to the drawing. FIG. 18 is a drawing for explaining the fourth exemplary embodiment of the present invention.

With reference to FIG. 18, in the communication system 1 of the fourth exemplary embodiment of the process rule, a controller 111 corresponding to the controllers 11 and 100 in the first and the second exemplary embodiment, OFSs 121 to 124 having the functions of the communication device, the packet forwarding device, and the intermediate controller in the first and the second exemplary embodiment, and servers 171 and 172 providing services to the communication terminals 140 and 141 are shown.

The OFSs 121 to 124 are arranged dispersed within a router network and an IP tunnel is constructed between the OFSs. At this time, the OFSs virtually recognize the IP tunnel constructed between the OFSs as a physical port. With such a configuration, a widely distributed data center system can be virtually constructed, overlaying the router network.

Further, the OFSs 121 to 124 announce to the surrounding router networks that packets sent to the servers 171 and 172 should be forwarded to the OFSs 121 to 124. Because of this, packets for the communication terminals 140 and 141 to access the widely distributed data center system are sent to the OFSs close to the communication terminals 140 and 141.

Here, the scope of authority delegated to the OFSs operating as the intermediate controller sets the input port information to "Any," the output information to "Any," and the flow scope to "a packet in which the IP addresses of the source and the destination are not the server 171 or 172."

Further, the path control policy of each OFS, operating as the intermediate controller, for these packet flows (sent to/from the servers 171 and 172) is to forward them using a path control protocol such as OSPF and based on a routing table constructed in cooperation with the surrounding OFSs.

With such a configuration, the path of a packet flow for accessing the widely distributed data center system can be controlled by the high-rank controller 111, and each OFS can perform autonomous and decentralized control of the paths of other packet flows.

The exemplary embodiments of the present invention have been described, however, the present invention is not limited to the exemplary embodiment above and further modifications, replacements, and adjustments can be added within the scope of the basic technological concept of the present invention. For instance, in the second exemplary embodiment, there is only one layer of the intermediate controller between the controller 11 and the packet forwarding device, however, a configuration in which a plurality of layers are provided and a high-rank intermediate controller delegates authority (control target packet flows) to a low-rank intermediate controller may be employed.

Further, the numbers of the communication devices, the intermediate controllers, the packet forwarding devices (OFSs) managed by the intermediate controller, and the OFSs in the exemplary embodiments above are merely examples and not limited to any particular numbers.

Further, each controller is triggered by the arrival of a data packet in the packet forwarding device to start the setting of a processing rule in the exemplary embodiments above, however, the setting of a processing rule may be triggered by something else other than the reception of a data packet.

Further, for instance, in the first exemplary embodiment, the intermediate controller determines whether or not a packet for which the packet forwarding device has sent a request for setting a processing rule belongs to the identification condition (the scope of authority delegated) by referring to the identification condition (the scope of authority delegated) for identifying a control target packet flow thereof. If the packet belongs to the scope of authority delegated, the intermediate controller controls the path of the packet, and if it does not, the intermediate controller defers to the high-rank controller. However, the information the intermediate controller is equipped with may use an identification condition for identifying a packet flow that is not a control target of the intermediate controller (the scope of authority not delegated). In this case, the intermediate controller determines whether or not a packet flow for which a request for setting a processing rule has been made belong to the scope of authority not delegated, and if it does, the intermediate controller defers to the high-rank controller, and if it does not, the intermediate controller controls the path thereof.

Further, in the exemplary embodiments above, the controller 11 notifies the intermediate controller of the scope of authority delegated, however, the role of notifying the intermediate controller of the scope of authority delegated may be performed by another function (for instance, a network management function, etc.).

Further, in the exemplary embodiments above, the controller notifies the intermediate controller of the scope of authority delegated, however, other pieces of information such as a permitted action and path calculation/selection policy may be notified along therewith.

Further, in the exemplary embodiments above, all the packet forwarding devices in the communication system are controlled via the intermediate controllers, however, the communication system may be configured in such a manner that some packet forwarding devices are controlled by the intermediate controllers and the other packet forwarding devices are directly controlled by the controller.

Further, in the fourth exemplary embodiment, the IP address of a server is used for specifying the scope of authority delegated, however, a subnet may be also used.

The explanation of the present invention has been made assuming that the path control target packets are Ethernet frames, however, the present invention can be also applied to IP packets not including an Ethernet header. In other words, the present invention is not limited by a communication protocol.

Further, each disclosure of Patent Literatures and Non Patent Literatures is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

Finally, modes of the present invention will be summarized.

(Mode 1)

A communication system including:

a controller controlling the forwarding path of a packet flow; and at least one communication device determining whether to request the controller to control the forwarding path of a packet flow or control the forwarding path of the packet flow by referring to an identification condition for identifying a packet flow that should be controlled by the communication device.

(Mode 2)

The communication system in Mode 1, wherein the controller and the communication device control the forwarding path of a packet flow by setting a processing rule in a packet forwarding device comprising a packet processing unit that processes a received packet according to the processing rule associating processing applied to a packet and a matching rule for specifying a packet to which the processing is applied.

(Mode 3)

The communication system in Mode 2, wherein the communication device determines whether to request the controller to control the forwarding path of a packet flow or control the forwarding path of the packet flow depending on whether or not a request for setting the processing rule matches the identification condition when receiving the request for setting the processing rule from the packet forwarding device.

(Mode 4)

The communication system in any one of Modes 1 to 3, wherein the communication device comprises a packet processing unit processing a received packet according to a processing rule associating processing applied to a packet and a matching rule for specifying a packet to which the processing is applied.

(Mode 5)

The communication system in Mode 4, wherein when receiving a packet that does not correspond to any of matching rules for specifying a packet to which the processing rule is applied, the communication device determines whether to request the controller to control the forwarding path of a packet flow or control the forwarding path of the packet flow depending on whether or not the received packet matches the identification condition.

(Mode 6)

The communication system in any one of Modes 1 to 5, wherein a condition determining whether or not a packet flow is forwarded within a communication subsystem in which the communication device is disposed is set as the identification condition.

(Mode 7)

The communication system in any one of Modes 1 to 5, wherein a condition determining whether or not the type of a packet is a predetermined type is set as the identification condition.

(Mode 8)

The communication system in any one of Modes 1 to 5, wherein a condition determining whether or not the source or the destination of a packet is a predetermined source or destination is set as the identification condition.

(Mode 9)

The communication system in any one of Modes 1 to 8, wherein the communication device constitutes a virtual packet forwarding device by controlling a packet forwarding device (s) in a communication subsystem in which the communication device(s) is disposed.

(Mode 10)

The communication system in Mode 9, wherein the controller sends the communication device a processing rule for a virtual packet forwarding device; and the communication device converts the processing rule received from the controller into a processing rule for a packet forwarding device in the communication subsystem in which the communication device is disposed.

(Mode 11)

The communication system in any one of Modes 1 to 10, wherein the identification condition is constituted by any of the following information elements: input port information indicating the scope of a communication device receiving the packet first and of the input port thereof, output port information indicating the scope of the output destination of the packet, and flow scope information indicating the scope of flows that become control targets.

(Mode 12)

A communication system including:

at least one packet forwarding device comprising a packet processing unit that processes a received packet according to a processing rule associating processing applied to a packet and a matching rule for specifying a packet to which the processing is applied;

at least one intermediate controller setting a processing rule in the packet forwarding device;

a high-rank controller controlling the intermediate controller; and the intermediate controller determining whether to request the high-rank controller to control the forwarding path of a packet flow or control the forwarding path of the packet flow by referring to an identification condition for identifying a packet flow that should be controlled by the intermediate controller.

(Mode 13)

A communication system including:

a plurality of packet forwarding devices comprising a packet processing unit that processes a received packet according to a processing rule associating processing applied to a packet and a matching rule for specifying a packet to which the processing is applied;

a controller setting a processing rule in the packet forwarding devices; and a device operating as an intermediate controller out of the packet forwarding devices determining whether to request the controller to control the forwarding path of a packet flow or control the forwarding path of the packet flow by referring to an identification condition for identifying a packet flow that should be controlled by the device.

(Mode 14)

A communication device determining whether to request the controller to control the forwarding path of a packet flow or control the forwarding path of the packet flow by referring to an identification condition for identifying a packet flow that should be controlled by the communication device.

(Mode 15)

The communication device in Mode 14 controlling the forwarding path of a packet flow by setting a processing rule in a packet forwarding device comprising a packet processing unit that processes a received packet according to the processing rule associating processing applied to a packet and a matching rule for specifying a packet to which the processing is applied.

(Mode 16)

The communication device in Mode 15 determining whether to request the controller to control the forwarding path of a packet flow or control the forwarding path of the packet flow depending on whether or not a request for setting the processing rule matches the identification condition when receiving the request for setting the processing rule from the packet forwarding device.

(Mode 17)

The communication device in any one of Modes 14 to 16 comprising a processing unit processing a received packet according to a processing rule associating processing applied to a packet and a matching rule for specifying a packet to which the processing is applied.

(Mode 18)
The communication device in Mode 17 determining whether to request the controller to control the forwarding path of a packet flow or control the forwarding path of the packet flow depending on whether or not a received packet matches the identification condition when receiving the packet that does not correspond to any of matching rules for specifying a packet to which the processing rule is applied.
(Mode 19)
The communication device in any one of Modes 14 to 18, wherein
a condition determining whether or not a packet flow is forwarded within a communication subsystem in which the communication device is disposed is set as the identification condition.
(Mode 20)
The communication device in any one of Modes 14 to 18, wherein
a condition determining whether or not the type of a packet is a predetermined type is set as the identification condition.
(Mode 21)
The communication device in any one of Modes 14 to 18, wherein
a condition determining whether or not the source or the destination of a packet is a predetermined source or destination is set as the identification condition.
(Mode 22)
The communication device in any one of Modes 14 to 21 constituting at least one virtual packet forwarding device by controlling a packet forwarding device(s) in a communication subsystem in which the communication device(s) is disposed.
(Mode 23)
The communication device in Mode 22 converting a processing rule for a virtual packet forwarding device received from the controller into a processing rule for a packet forwarding device in a communication subsystem in which the communication device is disposed.
(Mode 24)
The communication device in any one of Modes 14 to 23, wherein
the identification condition is constituted by any of the following information elements: input port information indicating the scope of a communication device receiving the packet first and of the input port thereof, output port information indicating the scope of the output destination of the packet, and flow scope information indicating the scope of flows that become control targets.
(Mode 25)
A controller controls the forwarding path of a packet flow by sending a processing rule for a virtual packet forwarding device to a communication device constituting a virtual packet forwarding device(s) by controlling a packet forwarding device(s).
(Mode 26)
The controller in Mode 25 setting the identification condition for (setting the scope of authority delegated to) the communication device.
(Mode 27)
A method for controlling the forwarding path of a packet flow including:
having at least one communication device connected to a controller controlling the forwarding path of a packet flow receive the setting of an identification condition for identifying a packet flow that should be controlled by the communication device; and
having the communication device determine whether to request the controller to control the forwarding path of a packet flow or control the forwarding path of the packet flow by referring to the identification condition.
(Mode 28)
A program having a communication device connected to a controller controlling the forwarding path of a packet flow execute
a process of requesting the controller to control the forwarding path of a packet flow when the communication device determines to request the controller to control the forwarding path of the packet flow by referring to an identification condition for identifying a packet flow that should be controlled by the communication device; and
a process of controlling the forwarding path of a packet flow when the communication device determines to control the packet flow of the packet flow by referring to the identification condition.

REFERENCE SIGNS LIST

1: communication system
2, 3: communication subsystem
11, 100, 111, 114: controller
12, 13, 112, 113: intermediate controller
21 to 23, 31 to 33: packet forwarding device
51: communication unit
52: control message processing unit
53: path/action calculation unit
54: intermediate controller management unit
55: topology management unit
56: flow termination point management unit
57: processing rule management unit
58: processing rule storage unit
59: scope-of-authority-delegated management unit
60: scope-of-authority-delegated storage unit
61: packet forwarding device management unit
62: virtual packet forwarding device unit
121 to 124, 131 to 133: OpenFlow switch (OFS)
140 to 142: communication terminal
150: base station
151: new base station
152: access Gateway (GW)
153: bootstrap server
160 to 162: router network
171, 172: server
210 to 240: communication device
310 to 330: communication terminal
1001: communication unit
1002: entry management unit
1003: entry database (entry DB)
1004: calculation unit
1005: topology management unit
1006: identification rule management unit
2000, 2000-1, 2000-2: table
2100: packet processing unit
2101: entry setting unit
2102: packet identifying unit
2103: judgment unit
2104: communication unit
2105: storage unit

What is claimed is:
1. A switch apparatus, comprising:
a memory configured to store a first packet processing rule identifying a first process for received packets and a second packet processing rule identifying a second process for received packets; and a processor configured to execute program instructions to:
receive the first packet processing rule from a control apparatus, configured to control the switch apparatus, by using a first protocol;
set the second packet processing rule based on a second protocol;
identify, based on an input port of a received packet, a packet processing rule to apply to the received packet from one of the first packet processing rule and the second packet processing rule;
process the received packet based on the identified packet processing rule; and
send, to the control apparatus, a request to process the received packet.

2. The switch apparatus according to claim 1, wherein the processor is further configured to execute program instructions to send the request to the control apparatus when the received packet does not match an identified packet processing rule corresponding to the first packet processing rule.

3. The switch apparatus according to claim 1, wherein the processor is further configured to execute program instructions to receive, from the control apparatus, the first packet processing rule corresponding to the request.

4. The switch apparatus according to claim 1, wherein the processor is further configured to execute program instructions to identify, based on the input port of the received packet and an attribute of the received packet, the packet processing rule to apply to the received packet from one of the first packet processing rule and the second packet processing rule.

5. The switch apparatus according to claim 1, wherein the processor is further configured to execute program instructions to identify, based on the input port of the received packet and a network domain to which the received packet belongs, the packet processing rule to apply to the received packet from one of the first packet processing rule and the second packet processing rule.

6. A network system, comprising:
a switch apparatus; and
a control apparatus configured to control the switch apparatus by using a first protocol,
wherein the switch apparatus comprises:
a memory configured to store a first packet processing rule identifying a first process for received packets and a second packet processing rule identifying a second process for received packets; and
a processor configured to execute program instructions to:
receive the first packet processing rule from the control apparatus, by using the first protocol;
set the second packet processing rule, based on a second protocol;
identify, based on an input port of a received packet, a packet processing rule to apply to the received packet from one of the first packet processing rule and the second packet processing rule;
process the received packet based on the identified packet processing rule; and
send, to the control apparatus, a request to process the received packet.

7. The network system according to claim 6, wherein the processor is further configured to execute program instructions to send the request to the control apparatus when the received packet does not match an identified packet processing rule corresponding to the first packet processing rule.

8. The network system according to claim 6, wherein the processor is further configured to execute program instructions to receive, from the control apparatus, the first packet processing rule corresponding to the request.

9. The network system according to claim 6, wherein the processor is further configured to execute program instructions to identify, based on the input port of the received packet and an attribute of the received packet, the packet processing rule to apply to the received packet from one of the first packet processing rule and the second packet processing rule.

10. The network system according to claim 6, wherein the processor is further configured to execute program instructions to identify, based on the input port of the received packet and a network domain to which the received packet belongs, the packet processing rule to apply to the received packet from one of the first packet processing rule and the second packet processing rule.

11. A communication method, comprising:
receiving a first packet processing rule from a control apparatus configured to control a switch apparatus, by using a first protocol, the first packet processing rule identifying a first process for received packets;
setting a second packet processing rule based on a second protocol, the second packet processing rule identifying a second process for received packets;
identifying, based on an input port of a received packet, a packet processing rule to apply to the received packet from one of the first packet processing rule and the second packet processing rule;
processing the received packet based on the identified packet processing rule; and
sending, to the control apparatus, a request to process the received packet.

12. The communication method according to claim 11, further comprising sending the request to the control apparatus when the received packet does not match an identified packet processing rule corresponding to the first packet processing rule.

13. The communication method according to claim 11, further comprising receiving, from the control apparatus, the first packet processing rule corresponding to the request.

14. The communication method according to claim 11, further comprising identifying, based on the input port of the received packet and an attribute of the received packet, the packet processing rule to apply to the received packet from one of the first packet processing rule and the second packet processing rule.

15. The communication method according to claim 11, further comprising identifying, based on the input port of the received packet and a network domain to which the received packet belongs, the packet processing rule to apply to the received packet from one of the first packet processing rule and the second packet processing rule.

16. A non-transitory, computer-readable recording medium recording a communication program, the program causing a computer to execute instructions to perform the communication method of claim 11.

17. A non-transitory, computer-readable recording medium of claim 16, the program further causing the computer to execute instructions to send, to the control apparatus, a request to process the received packet.

* * * * *